(12) United States Patent
Yamada

(10) Patent No.: US 7,667,881 B2
(45) Date of Patent: Feb. 23, 2010

(54) METHOD OF COPYING COLOR IMAGE AND COPIER USING THE SAME

(75) Inventor: Kazumi Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 428 days.

(21) Appl. No.: 11/542,916

(22) Filed: Oct. 3, 2006

(65) Prior Publication Data

US 2007/0091110 A1    Apr. 26, 2007

(30) Foreign Application Priority Data

Oct. 3, 2005    (JP) .................. P2005-289682

(51) Int. Cl.
*G03F 3/08*    (2006.01)
*G06F 15/00*    (2006.01)
*G06K 9/00*    (2006.01)

(52) U.S. Cl. .................. 358/518; 358/1.9; 382/167
(58) Field of Classification Search .............. 358/518, 358/520, 523, 524, 501, 1.1, 1.9; 382/167, 382/162

See application file for complete search history.

(56) References Cited

U.S. PATENT DOCUMENTS

| | | | | |
|---|---|---|---|---|
| 5,212,546 A * | 5/1993 | Arazi et al. | .................. | 358/518 |
| 5,664,072 A * | 9/1997 | Ueda et al. | .................. | 358/1.9 |
| 5,696,839 A * | 12/1997 | Siegeritz | .................. | 382/162 |
| 6,268,939 B1 * | 7/2001 | Klassen et al. | .................. | 358/518 |
| 6,664,973 B1 * | 12/2003 | Iwamoto et al. | .................. | 345/589 |
| 6,683,982 B1 * | 1/2004 | Kohn | .................. | 382/167 |
| 7,339,619 B2 * | 3/2008 | Tsuruoka | .................. | 348/234 |
| 2005/0220340 A1 * | 10/2005 | Nakabayashi et al. | .................. | 382/167 |
| 2005/0243339 A1 * | 11/2005 | Kuhn et al. | .................. | 358/1.9 |
| 2006/0082804 A1 * | 4/2006 | Hiramatsu | .................. | 358/1.14 |
| 2006/0245016 A1 * | 11/2006 | Fukao et al. | .................. | 358/518 |
| 2007/0091213 A1 * | 4/2007 | Jaspers | .................. | 348/687 |
| 2008/0002216 A1 * | 1/2008 | Matsushima | .................. | 358/1.9 |
| 2008/0107360 A1 * | 5/2008 | Yamashita et al. | .................. | 382/313 |
| 2008/0158626 A1 * | 7/2008 | Bang et al. | .................. | 358/518 |

FOREIGN PATENT DOCUMENTS

| | | |
|---|---|---|
| JP | 09-172545 | 6/1997 |
| JP | 09-207388 | 8/1997 |

OTHER PUBLICATIONS

Abstract of Japanese Patent Publication No. 09-172545, Pub. Date: Jun. 30, 1997, Patent Abstracts of Japan.
Abstract of Japanese Patent Publication No. 09-207388, Pub. Date: Aug. 12, 1997, Patent Abstracts of Japan.

* cited by examiner

*Primary Examiner*—Madeleine A Nguyen
(74) *Attorney, Agent, or Firm*—Martine Penilla & Gencarella, LLP

(57) ABSTRACT

An original color image is read to generate color image data. The color image data is converted into coordinate data including values associated with a first coordinate value and a second coordinate value in a color space. The first coordinate value is indicative of brightness. It is acquired correction data including values corresponding to the second coordinate value which are determined in accordance with the values included in the coordinate data and associated with the first coordinate value. The coordinate data is corrected with the correction data. A color image is printed with the corrected coordinate data, thereby obtaining a copied image of the original color image.

5 Claims, 19 Drawing Sheets

METHOD OF COPYING COLOR IMAGE AND COPIER USING THE SAME

BACKGROUND

1. Technical Field of the Invention

The present invention relates to a technology for copying a printed original color image, and particularly, to a technology for correcting colors of an original color image so that the color image can be copied with accurate colors.

2. Related Art

In line with advancement of digital technology represented by a computer, today, it has become possible to easily print color images of high quality in typical homes. For example, it is possible to carry out high quality color printing of images prepared by a computer and images captured by a digital camera, using a home color printer.

As a matter of course, the format for handling color images in a device on the side of generating color image data such as a computer, a digital camera, etc., is greatly different from that on the side of printing color images such as a color printer. That is, while the computer and digital camera express color images based on RGB image data in which gradation values of respective colors of RGB called three primary colors of light, the color printer prints color images using a plurality colors of ink or toner of C (Cyan), M (Magenta), Y (Yellow) and K (Black). Therefore, when printing color images, after the RGB image data are converted to an expression format consisting of respective colors of CMYK by applying a predetermined image processing to the RGB image data on the computer, data thus obtained are supplied to a color printer, whereby color printing is executed.

Further, in recent years, such a color printer in which a function of executing an image processing is internally incorporated, and a so-called scanner function of generating RGB image data by reading original color images is incorporated has been developed. A color printer called a hybrid machine can be used as if it is a color copier, wherein image data read from original color images are subjected to an image processing and color images are printed.

Herein, after any one of various types of color printers calculates the adhesion amounts of ink or toner of respective colors of CMYK by applying an image processing to the RGB image data, it executes color printing by adhering a calculated amount of ink or toner onto a printing medium by any method of ejecting ink drops or utilizing electrostatic force. Therefore, it becomes impossible to adhere ink or toner by the calculated amounts thereof through a longer period of use, wherein a difference is brought about between the calculated amounts and the actual adhesion amounts, and color printing is not executed with accurate colors any longer.

Also, due to unevenness in production, strictly speaking, there is a difference in the adhesion amounts of ink and toner in individual color printers. Therefore, various types of technologies have been proposed, which correct the amounts of ink or toner to be adhered onto a printing medium to proper amounts by correcting the calculated amounts obtained in the image processing. Such technologies are disclosed, for example, in Japanese Patent Publication Nos. 9-172545A (JP-A-9-172545) and 9-207388A (JP-A-9-207388).

However, in a case of copying original color images, there is still a problem in that even if correction is executed by applying one of the proposed technologies, it is not always possible to copy original color images with correct colors.

SUMMARY

It is an advantage of some aspects of the invention to provide a technology capable of executing correction so that copied images of correct colors can always be obtained even if original color images are copied.

According to one aspect of the invention, there is provided a method of copying an original color image, comprising:

reading the original color image to generate color image data;

converting the color image data into coordinate data including values associated with a first coordinate value and a second coordinate value in a color space, the first coordinate value being indicative of brightness;

acquiring correction data including values corresponding to the second coordinate value which are determined in accordance with the values included in the coordinate data and associated with the first coordinate value;

correcting the coordinate data with the correction data; and printing a color image with the corrected coordinate data, thereby obtaining a copied image of the original color image.

The correction data may be configured such that no correction is applied to the second coordinate value in a case where the first coordinate value assumes a minimum value thereof or a maximum value thereof.

The correction data may be provided in the form of a multi-dimensional function in which the brightness is a variable.

The method may further comprise:

printing a reference image with color image data stored in advance;

reading the reference image to generate reference image data;

printing a copied image of the reference image with the reference image data;

reading the copied image of the reference image to generate copied reference image data;

converting the reference image data into first coordinate data including first values associated with the first coordinate value and the second coordinate value;

converting the copied reference image data into second coordinate data including second values associated with the first coordinate value and the second coordinate value comparing the reference image data and the copied reference image data to identify deviations between the first values associated with the second coordinate value and the second values associated with the second coordinate value under a condition that the first values associated with the first coordinate value and the second values associated with the second coordinate value have the same values; and determining the correction data based on the deviations.

The reference image may be an achromatic image.

According to one aspect of the invention, there is also provided a color image copier, comprising:

a reader, adapted to read an original color image to generate color image data;

a converter, operable to convert the color image data into coordinate data including values associated with a first coordinate value and a second coordinate value in a color space, the first coordinate value being indicative of brightness;

an acquirer, operable to acquire correction data including values corresponding to the second coordinate value which are determined in accordance with the values included in the coordinate data and associated with the first coordinate value;

a corrector, operable to correct the coordinate data with the correction data; and a printer, operable to print a color image with the corrected coordinate data, thereby obtaining a copied image of the original color image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
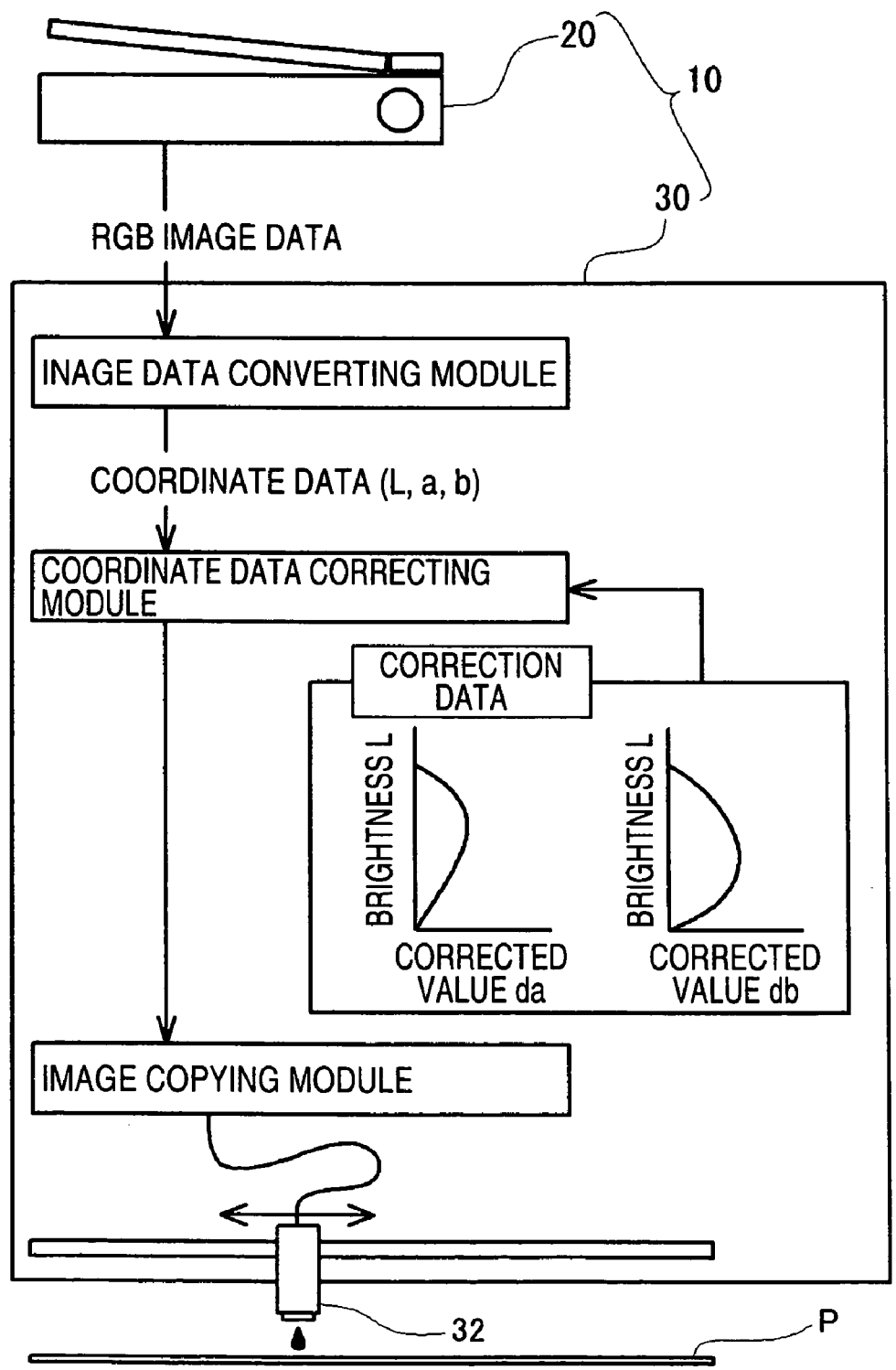
FIG. 1 is a schematic view showing a color image copier according to a first embodiment of the invention.

FIG. 1 shows a color image copier 10 according to a first embodiment of the invention, which is composed of a scanner 20 and a printer 30. The printer 30 is a so-called ink jet printer that prints color images by forming ink dots by ejecting ink drops of respective colors of CMYK onto a printing medium P. Further, the printer 30 incorporates various types of electronic circuits including the CPU, which are configured so as to be able to execute predetermined image processings in the printer 30. The scanner 20 generates RGB image data by optically reading an original color image and supplies the same to the printer 30. The printer 30 gives predetermined image processings to the received RGB image data and prints the same, wherein it becomes possible to obtain a copied image of the original color image.

Focusing attention on various types of functions executed in the printer 30 in order to copy an original color image, it can be considered that the printer 30 according to the present embodiment is composed of respective modules such as an image data converting module, a coordinate data correcting module, and an image copying module, etc. The image data converting module is a module for converting the RGB image data generated by the scanner 20 reading an original color image to coordinate data in a color space described by a plurality of coordinate values including a coordinate value corresponding to at least the brightness. A Lab color space composed of axis "L" expressing the brightness, and axis "a" and axis "b" expressing colors, and an HSB color space composed of axis "H" expressing hue, axis "S" expressing color saturation, and axis "B" expressing brightness may be used as such a color space. The example shown in FIG. 1 is expressed under the assumption that RGB image data are converted to coordinate data of the Lab color space.

The coordinate data correcting module is a module for correcting the coordinate data converted by the image data converting module in order to obtain a copied image in which the colors of an original color image are accurately reproduced. Correction data used to correct the coordinate data are stored in advance while being associated with the brightness. In the example shown in FIG. 1, correction value "da" for component "a" of the coordinate data and correction value "db" for component "b" thereof are stored while being associated with the brightness L, respectively. As a matter of course, if the coordinate data are coordinate data of the HSB color space, correction value dH for H (hue) component and correction value dS for S (color saturation) component may be stored while being associated with the brightness B. In addition, the correction values are not necessarily stored for all the components other than the brightness. For example, only the correction value dH for H (hue) component may be stored while being associated with the brightness B. The coordinate data correcting module corrects the coordinate data based on such correction data and supplies the post-correction coordinate data to the image copying module.

The image copying module determines the ejection amounts of respective ink of CMYK on the basis of the coordinate data supplied from the coordinate data correcting module and ejects ink drops onto a printing medium P, whereby a copied image of an original color image, which is read by the scanner 20, is printed.

In this embodiment, the RGB image data generated by reading an original color image are thus converted to coordinate data in a color space once, correction is then executed in the color space on the basis of the correction data stored while being associated with the brightness, and the color image is finally printed. Therefore, where the color image copier 10 is subjected to chronological changes or individual unevenness, it becomes possible to copy the original color image with accurate colors for a further longer period of time. An additional description is given of this point.

Generally, copying of an original color image includes a stage of generating RGB image data by reading an original color image and a stage of determining the ejection amounts of ink (or adhesion amounts of toner) of respective colors of CMYK by applying predetermined image processings to the RGB image data, and ejecting ink by the determined amounts or adhering toner by the determined amounts. Chronological changes and individual unevenness in line with use of the color image copier are caused to be present in either stage. Therefore, eventually, the chronological changes and individual unevenness appear as changes in the ink ejection amount (or toner adhesion amount), and with respect to a certain ratio thereof, the chronological changes and individual unevenness in the stage of generating RGB image data from the original color image are reflected in the ink ejection amounts (or the toner adhesion amounts). For this reason, if it is attempted that the ink ejection amounts (or the toner adhesion amounts) are corrected only by the chronological changes or only by the individual unevenness, it is difficult to sufficiently correct the same.

On the other hand, in the color image copier 10, since correction is executed in a color space including at least the brightness as a coordinate axis with the correction data stored in advance while being associated with the brightness, it becomes possible to simply and sufficiently accurately correct the chronological changes and individual unevenness in the stage of generating the RGB image data from the original color image and the chronological changes and individual unevenness in the stage of ejecting ink by the determined amounts or adhering toner by the determined amounts.

Figure 2:
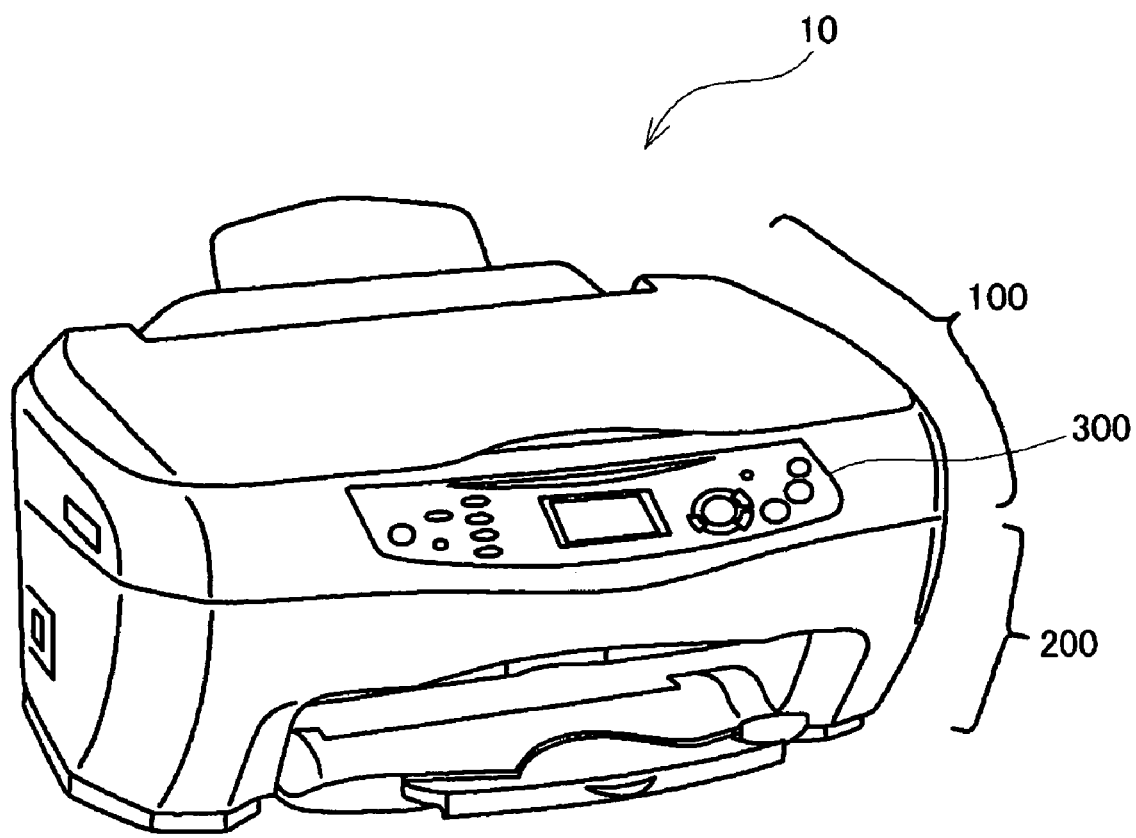
FIG. 2 is a perspective view showing an external appearance of the color image copier.

As shown in FIG. 2, the color image copier 10 is composed of a scanner section 100, a printer section 200, and a control panel 300 for setting operations of the scanner section 100 and the printer section 200. The scanner section 100 includes a scanner function for generating RGB image data by reading a printed color image, and the printer section 200 includes a printer function for printing images on a printing medium by receiving the RGB image data. Also, if an original color image read by the scanner section 100 is outputted from the printer section 200, a color copying function can be achieved. That is, the color image copier 10 is a so-called scanner-printer-copier hybrid machine (hereinafter called an "SPC hybrid machine") capable of independently achieving a scanner function, a printer function and a copying function.

Figure 3:
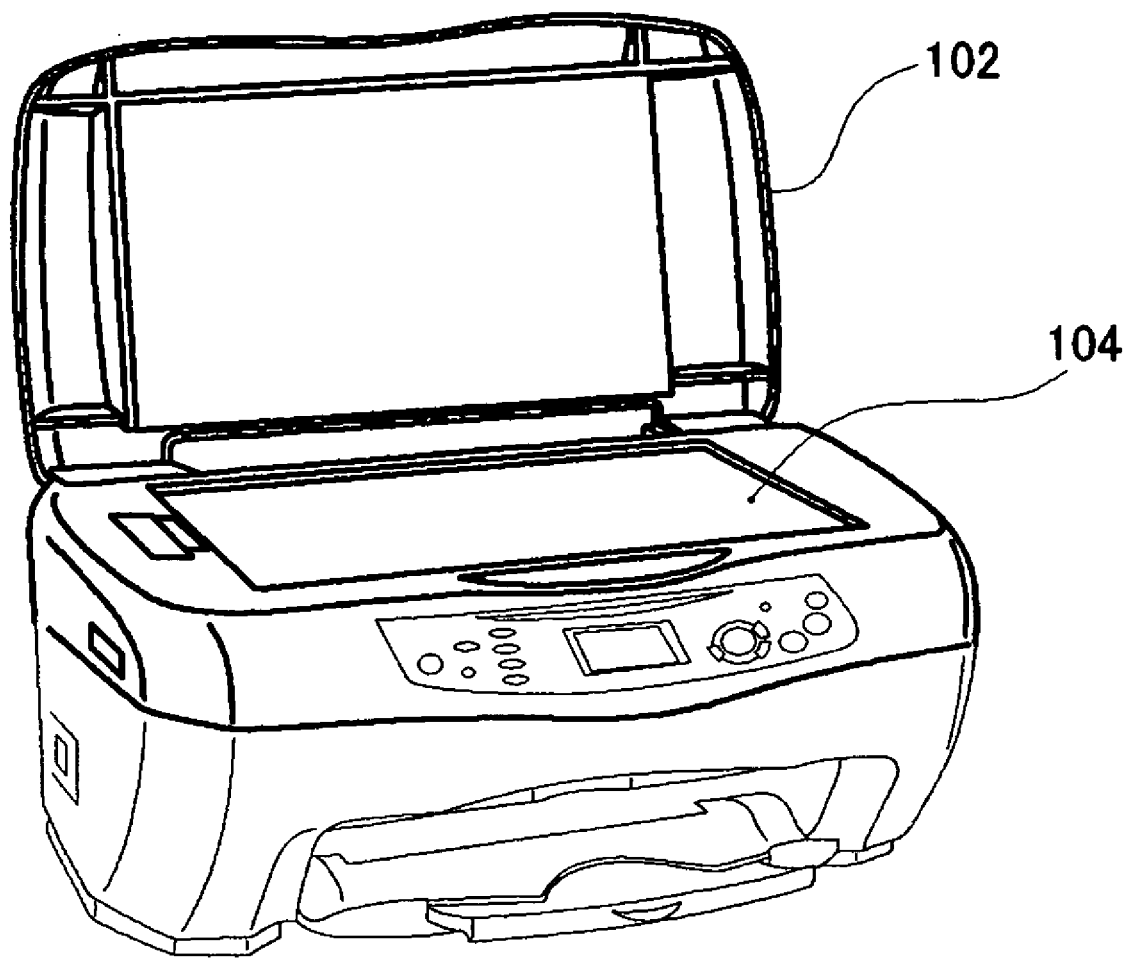
FIG. 3 is a perspective view showing a state that an table cover of the color image copier is opened.

FIG. 3 shows a state that an table cover 102 secured on the upper part of the color image copier 10 is opened in order to read a printed original color image. When the table cover 102 is opened upwards, a transparent original table 104 appears. Various types of mechanisms described later for achieving a scanner function are mounted in the interior of the original table 104. When reading the printed original color image, a printed color image is placed on the original table 104 with the table cover 102 opened as shown in the drawing, and a button on the control panel 300 is operated with the table cover 102 closed. Thereby, it is possible to immediately convert the original color image into RGB image data.

Figure 4:
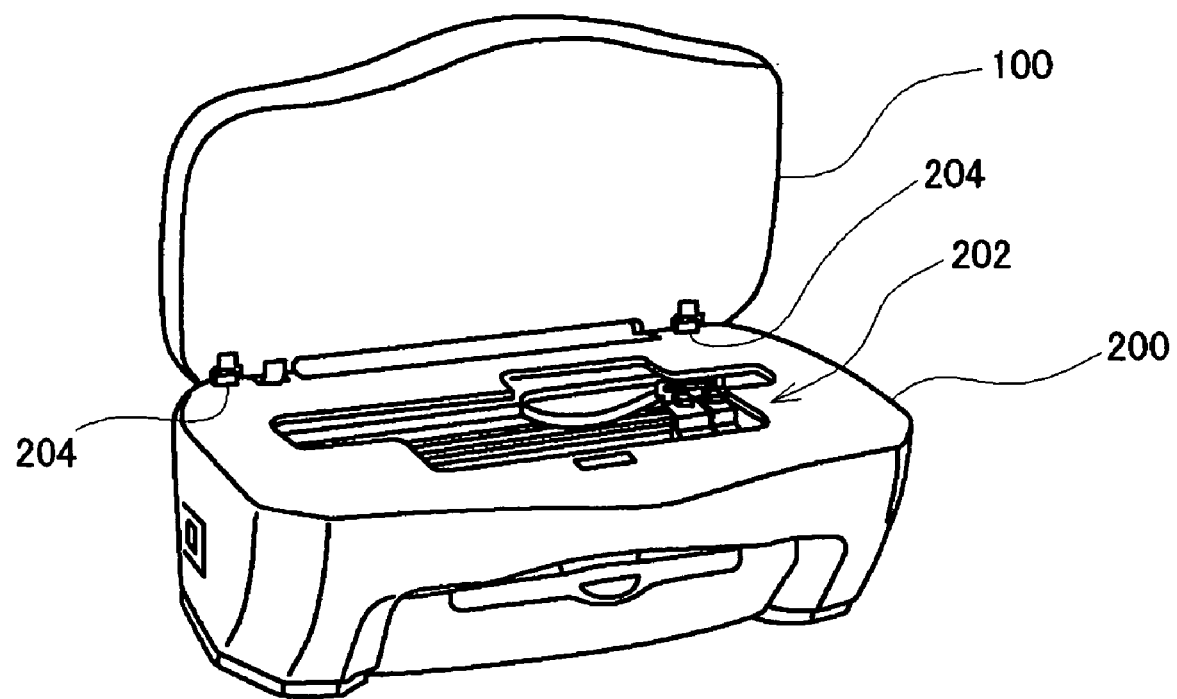
FIG. 4 is a perspective view showing a state that a scanner section of the color image copier is lifted up.

Further, the scanner section 100 is composed so as to be entirely accommodated in an integral casing. The scanner section 100 and the printer section 200 are coupled to each other by a hinge mechanism 204 (refer to FIG. 4) at the rear side of the color image copier 10. Therefore, if the front side of the scanner section 100 is lifted up, it is possible to turn only the scanner section 100 at the hinge portion as shown in FIG. 4.

Incidentally, the upper face of the printer section 200 can be exposed. In the interior of the printer section 200, various types of mechanisms, described later, to achieve the printer function, a control circuit 260, described later, to control the operations of the entirety of the color image copier 10 including the scanner section 100, and further a power circuit (not illustrated) to supply power to the scanner section 100 and the printer section 200 are provided. In addition, as shown in FIG. 4, an opening portion 202 is provided on the upper face of the printer section 200, through which replacement of consumables such as ink cartridges, treatment of paper jam, and easy repair can be simply executed.

Figure 5:
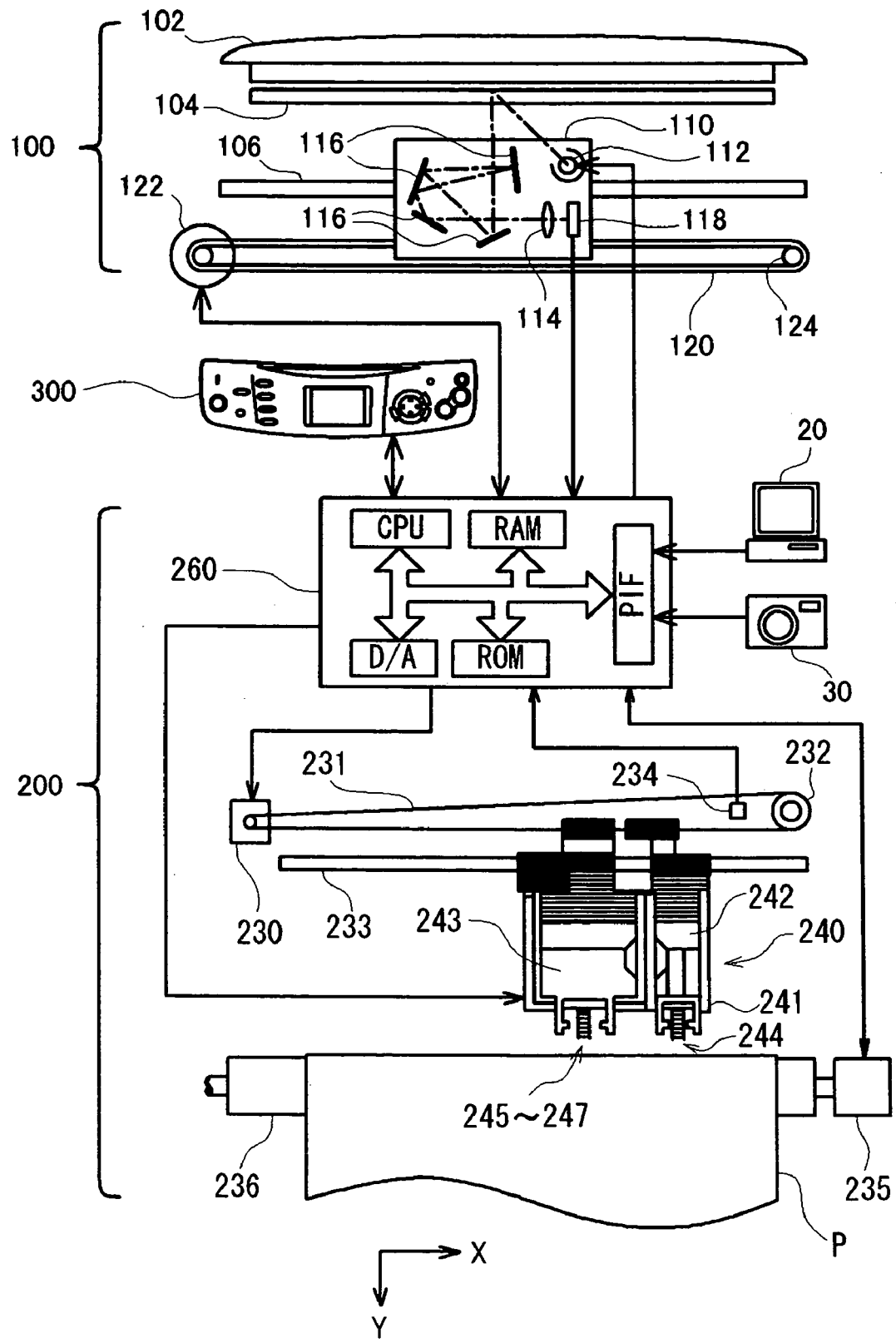
FIG. 5 is a schematic view showing an internal configuration of the color image copier.

Next, a description is given of the internal constructions of the scanner section 100 and the printer section 200 with reference to FIG. 5.

The scanner section 100 includes: the transparent original table 104 on which a printed original color image is set; a table cover 102 which presses a set original color image; a scanner carriage 110 for reading an original color image; a carriage belt 120 to move the scanner carriage 110 in the primary scanning direction X; a drive motor 122 to supply power to the carriage belt 120; and a guide shaft 106 to guide movements of the scanner carriage 110. In addition, operations of the drive motor 122 and the scanner carriage 110 are controlled by the control circuit 260 described later.

As the drive motor 122 is rotated under control of the control circuit 260, the motion thereof is transmitted to the scanner carriage 110 via the carriage belt 120. As a result, the scanner carriage 110 is moved in the primary scanning direction X in response to the turning angle of the drive motor 122 while being guided by the guide shaft 106. Also, the carriage belt 120 is adjusted in a state that proper tension is always given thereto by an idler pulley 124. Therefore, it becomes possible to move the scanner carriage 110 in the reverse direction by the distance responsive to the turning angle if the drive motor 122 is reversely rotated.

A light source 112, a lens 114, mirrors 116, and a CCD sensor 118 are incorporated in the interior of the scanner carriage 110. Light from the light source 112 is irradiated onto the original table 104 and is reflected from an original color image set on the original table 104. The reflected light is guided to the lens 114 by the mirror 116, is condensed by the lens 114 and is detected by the CCD sensor 118. The CCD 118 is composed of a linear sensor in which photo diodes for converting the light intensity to electric signals are arrayed in the direction orthogonal to the primary scanning direction X of the scanner carriage 110. For this reason, while moving the scanner carriage 110 in the primary scanning direction X, light of the light source 112 is irradiated onto an original color image, and the intensity of the reflected light is detected by the CCD sensor 118, whereby it is possible to obtain electric signals corresponding to the original color image.

Further, the light source 112 is composed of light emitting diodes of three colors of RGB, which is able to irradiate light of R color, G color and B color at a predetermined cycle by turns. In response thereto, reflected light of R color, G color and B color can be detected by the CCD sensor 118 by turns. Generally, although red portions of the image reflect light of R color, light of G color and B color is hardly reflected. Therefore, the reflected light of R color expresses the R component of the image. Similarly, the reflected light of G color expresses the G component of the image, and the reflected light of B color expresses the B component of the image. Accordingly, light of three colors of RGB is irradiated onto an original color image while being changed at a predetermined cycle. If the intensities of the reflected light are detected by the CCD sensor 118 in synchronization therewith, it is possible to detect the R component, G component, and B component of the original color image, wherein the color image can be read. In addition, since the scanner carriage 110 is moving while the light source 112 is changing the colors of light to be irradiated, strictly speaking, the position of an image for which the respective components of RGB are detected will differ corresponding to the amount of movement of the scanner carriage 110. However, the difference can be corrected by an image processing after the respective components are read.

The printer section 200 is provided with the control circuit 260 for controlling the operations of the entirety of the color image copier 10, a printer carriage 240 for printing images on a printing medium P, a mechanism for moving the printer carriage 240 in the primary scanning direction X, and a mechanism for feeding the printing medium P.

The printer carriage 240 is composed of an ink cartridge 242 for accommodating K ink, an ink cartridge 243 for accommodating various types of ink of C ink, M ink, and Y ink, and a head unit 241 secured on the bottom face. The head unit 241 is provided with an head for ejecting ink drops per ink. If the ink cartridges 242 and 243 are mounted in the printer carriage 240, respective ink in the cartridges are supplied to the printing heads 244 through 247 of respective ink through a conduit (not illustrated). In this embodiment, a description was given of a case where C ink, M ink, and Y ink are integrally accommodated in a single ink cartridge 243. However, it is possible that these ink are accommodated in respective exclusive ink cartridges formed separately from each other. Also, in addition to these ink, it is possible that C ink of low density (LC ink), M ink of low density (LM ink), and further K ink of low density (LK ink) are loaded.

The mechanism for moving the printer carriage 240 in the primary scanning direction X is composed of a carriage belt 231 for driving the printer carriage 240, a carriage motor 230 for supplying power to the carriage belt 231, a tension pulley 232 for applying proper tension to the carriage belt 231 at all times, a carriage guide 233 for guiding movements of the printer carriage 240, and a reference position sensor 234 for detecting the reference position of the printer carriage 240. If the carriage motor 230 is rotated under control of a control circuit 260 described later, the printer carriage 240 can be moved in the primary scanning direction X by the distance responsive to the turning angle. Further, if the carriage motor 230 is reversed, it is possible to cause the printer carriage 240 to move in the reverse direction.

The mechanism for feeding a printing medium P is composed of a platen 236 for supporting the printing medium P from the backside and a medium feeding motor 235 for feeding paper by rotating the platen 236. If the medium feeding motor 235 is rotated under control of a control circuit 260 described later, it is possible to feed the printing medium P in a secondary scanning direction Y by the distance responsive to the turning angle.

The control circuit 260 is composed of a ROM, a RAM, a D/A converter for converting digital data to analog signals, and further an interface PIF for peripheral devices for communications of data between the CPU and the peripheral devices, including the CPU. The control circuit 260 controls operations of the entirety of the color image copier 10 and controls these operations through communications of data between the light source 112, the drive motor 122 and the CCD 118, which are incorporated in the scanner section 100.

In addition, the control circuit 260 controls supplying drive signals to the printing heads 244 through 247 of respective colors and ejecting ink drops while causing the printer carriage 240 to be subjected to primary scanning and secondary scanning by driving the carriage motor 230 and the medium feeding motor 235. The drive signals supplied to the printing heads 244 through 247 are generated by reading image data from a computer 20 and a digital camera 30, and executing an image processing described later. As a matter of course, by applying an image processing to the RGB image data read by the scanner section 100, it is possible to generate the drive signals. Thus, under the control of the control circuit 260, ink dots of respective colors are formed on a printing medium P by ejecting ink drops from the printing heads 244 through 247 while causing the printer carriage 240 to be subjected to the primary scanning and secondary scanning, whereby it becomes possible to print a color image. As a matter of course, instead of executing an image processing in the control circuit 260, it is possible to drive the printing heads 244 through 247 by receiving image-processed data from the computer 20 while causing the printer carriage 240 to be subjected to the primary scanning and secondary scanning in compliance with the data.

Also, the control circuit 260 is connected so as to receive data from and transmit the same to the control panel 300, wherein by operating respective types of buttons secured on the control panel 300, it is possible to set detailed operation modes of the scanner function and the printer function. Furthermore, it is also possible to set detailed operation modes from the computer via the interface PIF for peripheral devices.

Figure 6:
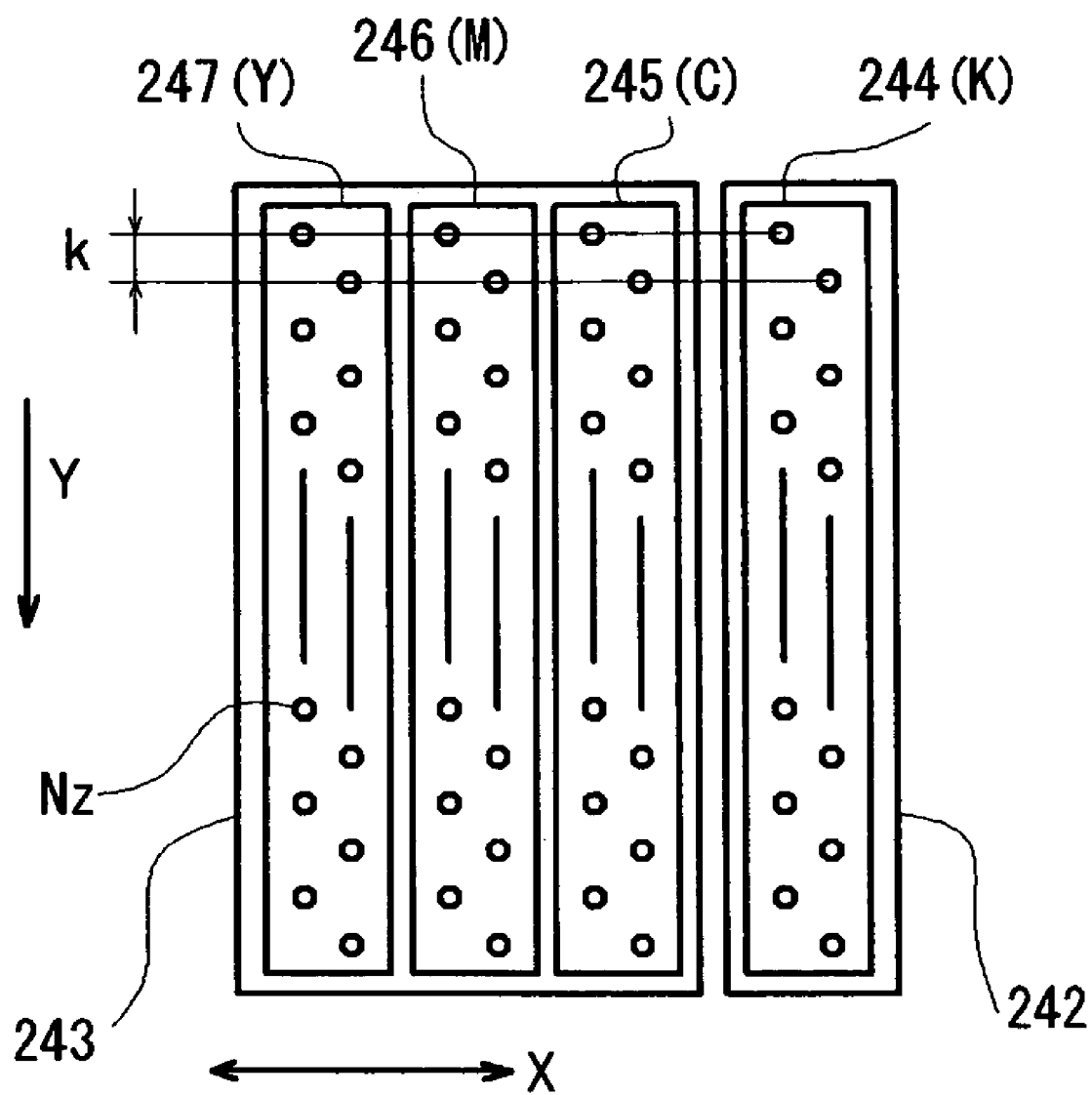
FIG. 6 is a schematic view showing nozzles of printing heads in a printer section of the color image copier.

As shown in FIG. 6, a plurality of nozzles Nz for ejecting ink drops are formed on the printing heads 244 through 247 of respective colors. As shown, four sets of nozzle arrays which eject ink drops of respective colors are formed on the bottom face of the printing heads of respective colors. In one set of the nozzle arrays, 48 nozzles Nz are arrayed in a zigzag manner with a pitch k. Drive signals are supplied from the control circuit 260 to the respective nozzles Nz, and the respective nozzles Nz eject drops of respective ink in compliance with the drive signals to form ink dots on a printing medium P.

In addition, various methods are applicable as a method for ejecting ink drops from the printing heads. That is, a system of ejecting ink using piezoelectric elements and a method of ejecting ink drops by generating bubbles in an ink passage by a heater disposed in the ink passage may be employed. Also, instead of ejecting ink, a system of forming ink dots on a printing medium using the phenomenon of thermal transfer and a system of adhering toner power of respective colors on a printing medium P utilizing static electricity may be employed.

As described above, the printer section 200 prints an image by forming dots on a printing medium P. Therefore, in order to copy an original color image by the color image copier 10, it is necessary to convert an original color image to a data format expressed in terms of dots by applying a proper image processing to image data generated by reading the original color image. In the following, a brief description is given of such a processing (that is, an image copying process). Also, in the color image copier 10, although an image processing is executed in the control circuit 260 incorporated in the printer section 200, the image processing may be executed by a computer secured at a peripheral site, and dots can be formed by reading the processed data through the interface PIF for peripheral devices.

Figure 7:
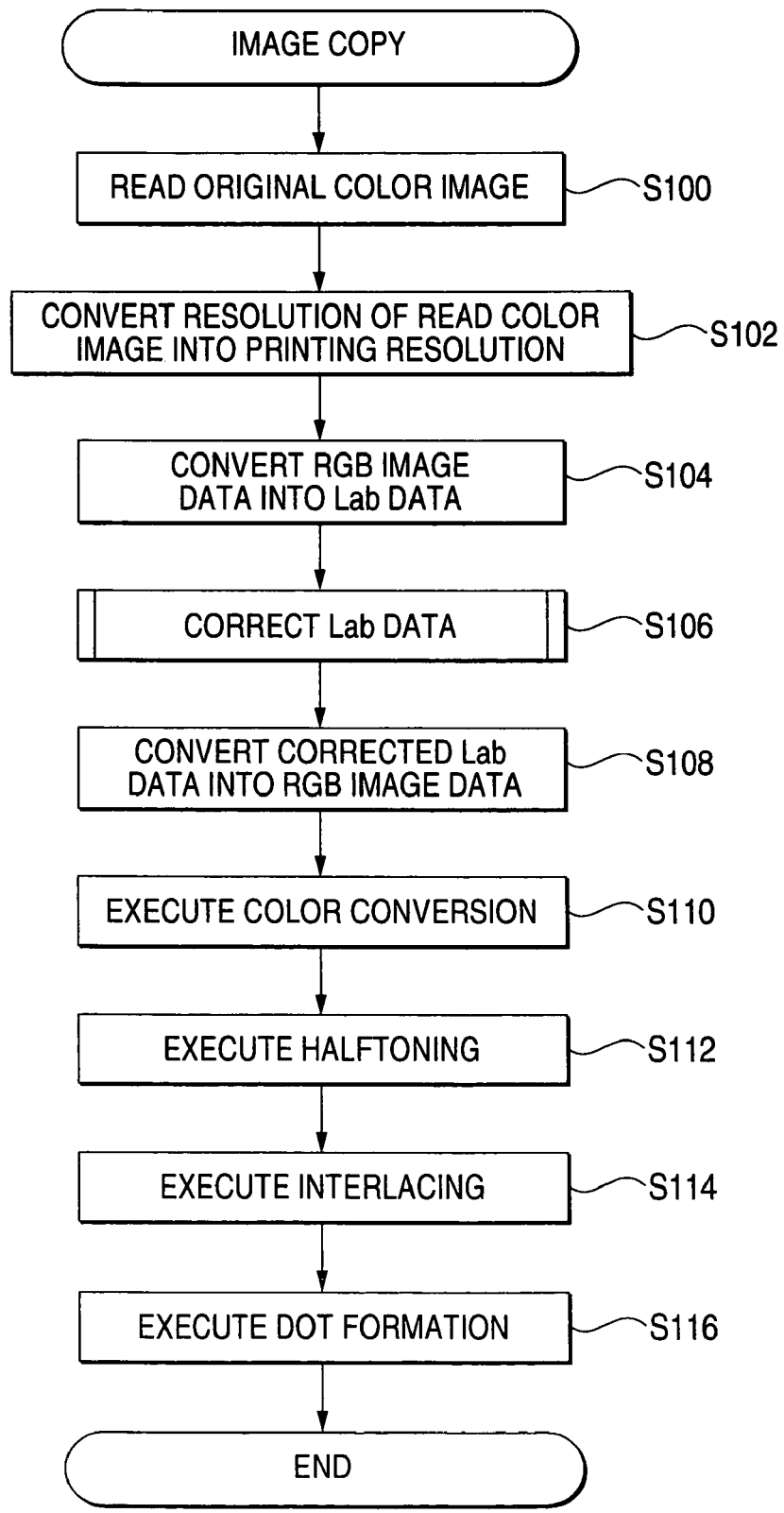
FIG. 7 is a flowchart showing an image copy processing executed in the color image copier.

FIG. 7 shows an image copy processing to copy an image by reading an original color image. Such a processing is executed by the control circuit 260 of the color image copier 10 when a user of the color image copier 10 sets an original color image to be copied, on the original table 104 and instructs commencement of copying using the control panel 300. Hereinafter, a description is given thereof in compliance with the flowchart. When the image copy processing is executed, first, a processing for reading an original color image set on the original table 104 and for generating RGB image data is executed (Step S100).

Next, a processing for converting the resolution of the read RGB image data to the resolution by which the printer section 200 can print (that is, printing resolution) is executed (Step S102). Where the resolution of the read RGB image data is lower than the printing resolution, the resolution is converted to a further higher resolution by executing an interpolation calculation between adjacent pixels and setting new image data. To the contrary, where the resolution of the read RGB image data is higher than the printing resolution, it is converted to a further lower resolution by thinning the image data between adjacent pixels at a specified ratio.

After the resolution of the image data is thus converted to the printing resolution, the control circuit 260 executes a processing for converting the RGB image data to Lab data (Step S104). The Lab data are data expressed in terms of coordinate values (L, a, b) of the Lab color space which is a representative uniform color space, wherein the component "L" expresses the brightness, component "a" and component "b" express hue and color saturation. Conversion from RGB image data to Lab data can be executed by using a well-known conversion equation. At this time, the conversion may be executed with reference to a profile showing the characteristics of the scanner section. In Step S104, a processing for converting to the Lab data is executed by applying the conversion equation to the RGB image data converted to the printing resolution.

Next, the control circuit 260 executes a processing of correcting the Lab data in order to correct influences due to chronological changes and individual unevenness of the color image copier 10 and to copy the original color image with proper colors (Step S106).

Figure 8:
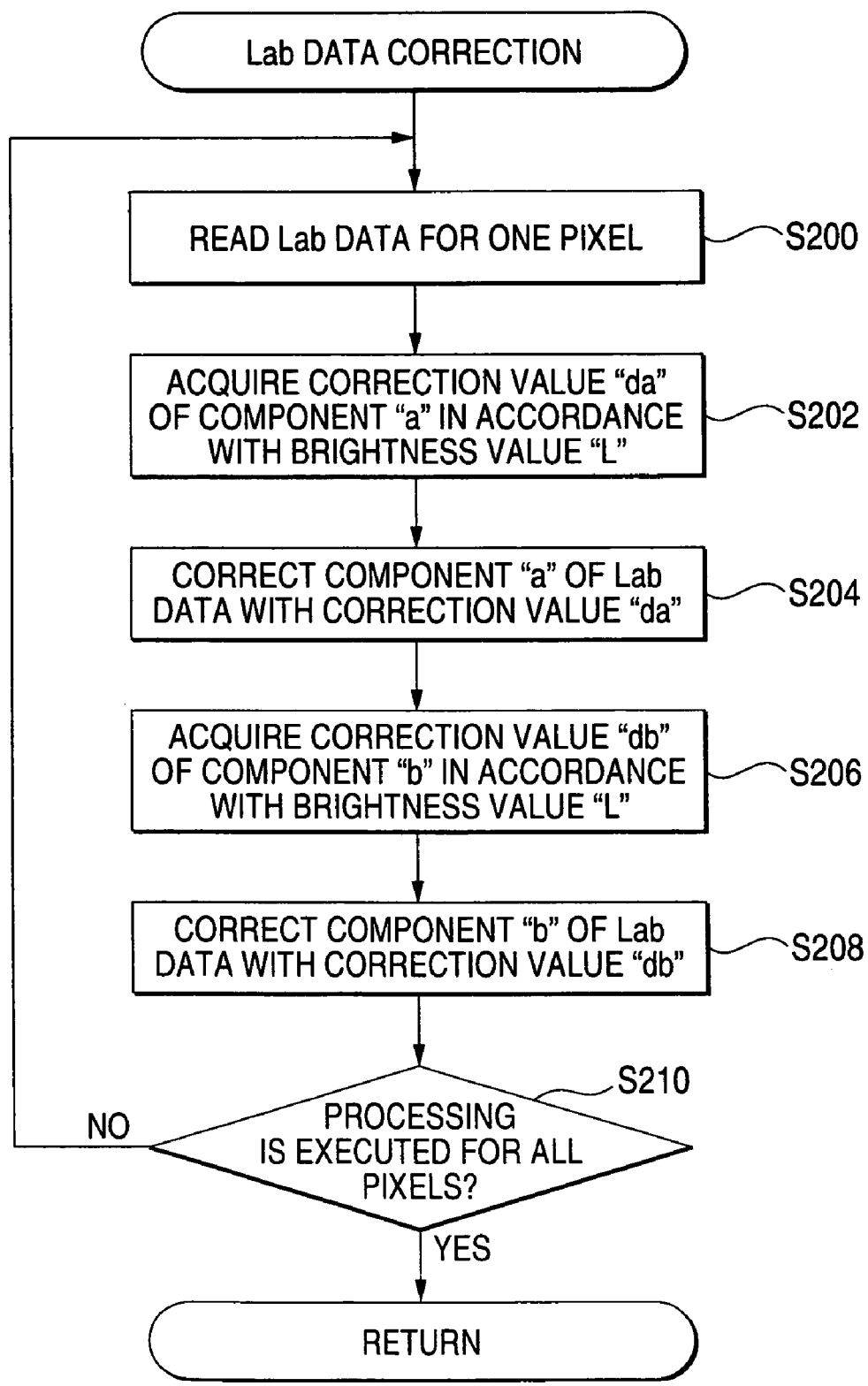
FIG. 8 is a flowchart showing an Lab data correction processing in the image copy processing.

FIG. 8 shows the details of the processing of correcting the Lab data. As correction of the Lab data is executed, first, one pixel of the object to be processed is selected, and the Lab data of the pixel are read (Step S200). The Lab data read here are data expressing the coordinate values in the Lab color space obtained by converting the RGB image data as described above.

Next, the correction value "da" to correct the component "a" of the read Lab data is acquired (Step S202). Here, the correction value "da" of the component "a" is stored while being associated with the gradation value of the component "L" expressing the brightness. And, in Step S202, the correction value "da" stored while being associated with the gradation value of the component "L" is acquired from the component "L" of the read Lab data.

Figure 9A:
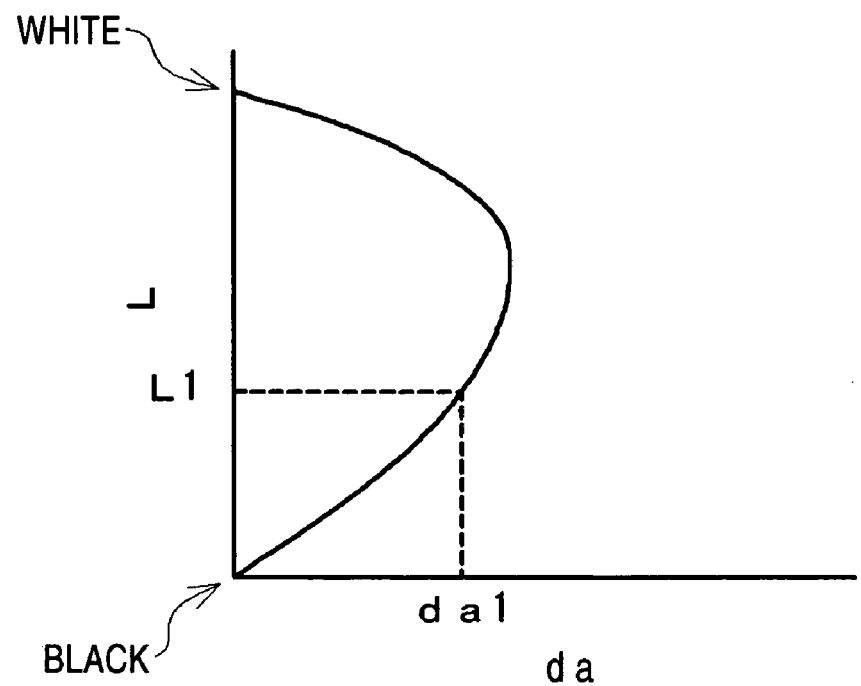
FIG. 9A is a diagram showing a relationship between components "L" of Lab data and correction values "da" for components "a" of the Lab data.
Figure 9B:
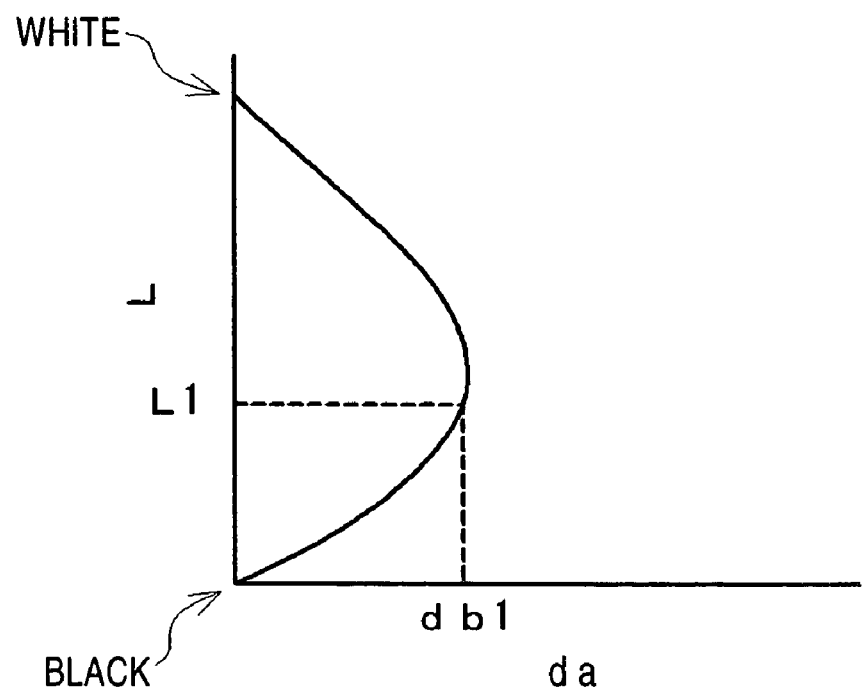
FIG. 9B is a diagram showing a relationship between components "L" of Lab data and correction values "db" for components "b" of the Lab data.

FIG. 9A shows that the correction value "da" of the component "a" is stored while being associated with the gradation values of the component "L" expressing the brightness. FIG. 9B shows that the correction value "db" of the component "b" is stored while being associated with the gradation values of the component "L" expressing the brightness.

Although such a method for setting the correction value "da" and correction value "db" will be described later, if an arbitrary brightness value L1 is determined in the range from the brightness for a pure black image to the brightness for a pure white image, it becomes possible to obtain the correction value "da" of the component "a" corresponding to the brightness value L1 and the correction value "db" of the component "b" corresponding thereto. Further, a format for storing these correction values may be a tabular format in which respective correction value "da" and correction value "db" are stored while being associated for each of the gradation values of the component "L," or may be a format of a function in which the respective correction value "da" and correction value "db" are stored with the gradation values of the component "L" used as variables thereof. Step S204 in FIG. 8 executes a processing of acquiring the correction value "da" of the component "a" stored for the gradation value of the component "L" of the Lab data.

Thus, after a correction value "da" of the component "a" is obtained in response to the gradation value of the component "L" expressing the brightness in the Lab data, the component "a" of the Lab data is corrected using the obtained correction value "da" (Step S204). Various correction methods may be applicable as the correction method. However, herein, it is assumed that the simplest method is employed, wherein the correction is executed by adding the correction value "da" to the component "a" of the Lab data. That is, where the correction value "da" is a positive value, the component "a" of the Lab data is corrected in an increasing direction, and to the contrary, where the correction value "da" is a negative value, the component "a" is corrected in a decreasing direction.

After the component "a" of the Lab data is corrected as described above, similar correction is executed for the component "b." That is, a correction value "db" for the component "b" is acquired in response to the component "L" of the Lab data (Step S206). The value of the component "b" of the Lab data is corrected using the obtained correction value "db" (Step S208).

Thus, after the component "a" and the component "b" for the selected pixel are corrected, it is judged whether or not correction of the Lab data is executed for all the pixels (Step S210). And, where there still remains pixels for which correction is not completed (Step S210: no), the processing is returned to Step S200, wherein after the Lab data of new pixels are read, a series of subsequent processings are executed. By repeating such operations, when it is judged that the values of the component "a" and the component "b" are corrected for all the pixels (Step S210: yes), the Lab data correction processing shown in FIG. 8 is terminated, and the processing is returned to the image copy processing in FIG. 7.

In the image copy processing in FIG. 7, when returning from the Lab data correction processing, a processing of converting the corrected Lab data to the RGB image data is executed (Step S108). In Step S104 described above, the RGB image data are converted to the Lab data in compliance with a predetermined conversion equation. However, in the processing of Step S108, the corrected Lab data are converted to the RGB image data by which the printer section 200 is able to reproduce the colors of the Lab data, by referencing, for example, 3-LUT of the profile showing the characteristics of the printer section 200. The RGB image data thus obtained are made into image data for which influences due to the chronological changes and individual unevenness of the color image copier 10 are corrected for the RGB image data obtained by reading the original color image.

Next, the control circuit 260 commences a color conversion processing (Step S110). The color conversion processing is a processing of converting the RGB image data to data corresponding to the use amounts of respective color ink incorporated in the printer. As described above, since the printer section 200 prints an image using ink of four colors of CMYK, in the color conversion processing of the embodiment, the processing converts the RGB image data to data of gradation values corresponding to the use amounts of ink of respective colors of CMYK. As a matter of course, where C ink of low density (LC ink), M ink of low density (L ink), or K ink of low density (LK ink) is loaded in addition to the four colors of C, M, Y and K, the RGB color image data may be converted to data of gradation values corresponding to the use amounts of ink of respective colors including these light ink.

Figure 10:
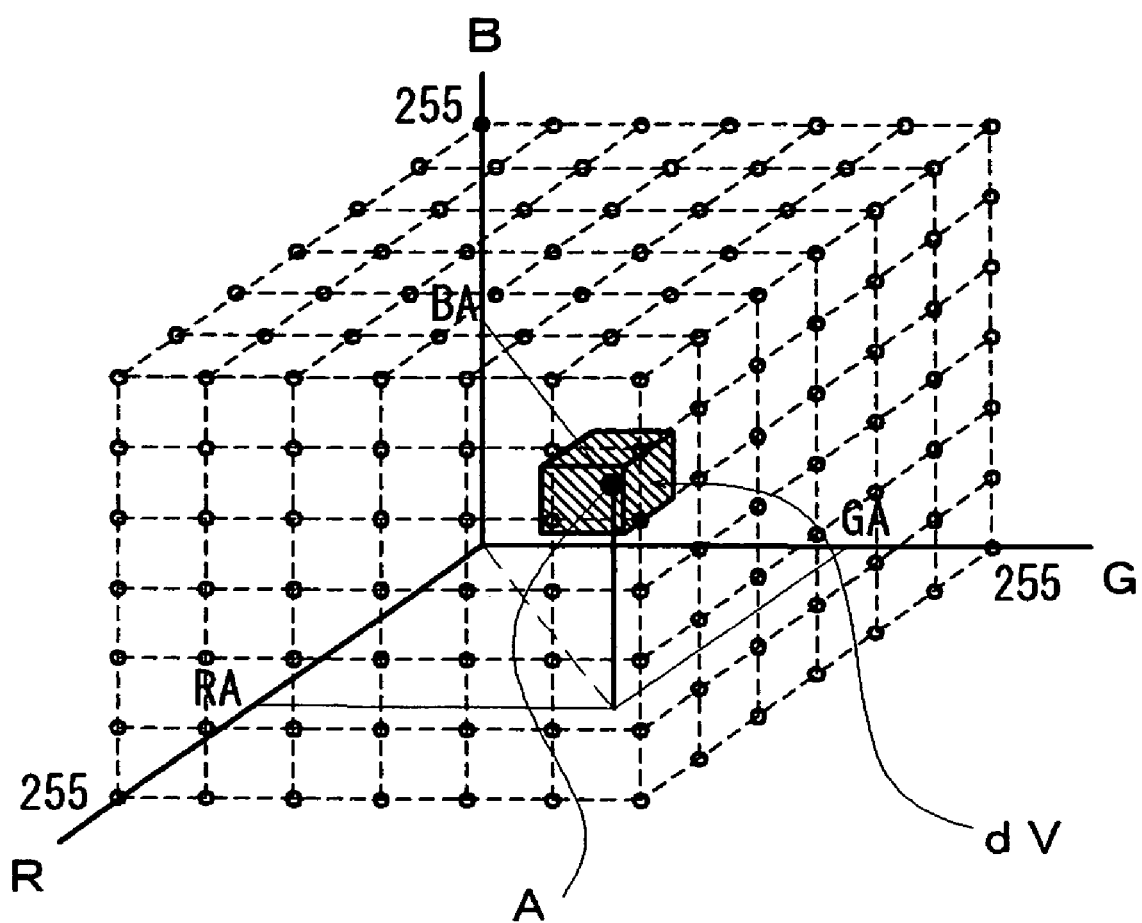
FIG. 10 is a diagram for explaining a color conversion table used in a color conversion processing in the image copy processing.

The color conversion processing is executed with reference to a three-dimensional numerical table called a look-up table (LUT). FIG. 10 shows a look-up table (LUT) to be referred to for the color conversion processing. Now, an RGB color space is taken into account, in which gradation values of respective colors of R, G and B are taken in three axes orthogonal to each other as shown in FIG. 10, and it is assumed that the gradation values of respective colors of RGB take values from 0 through 255. If so, all the RGB image data can be associated with an internal point of a cube (color solid), the original point of which is the top and the length of one side of which is 255. Therefore, changing the view point, if a plurality of lattice points are generated in the RGB color space by fragmenting the color solid in the form of a lattice orthogonal to the respective axes of RGB, it is considered that respective lattice points correspond to the RGB image data respectively. Therefore, combinations of gradation values corresponding to the use amounts of ink of respective colors of C, M, Y and K are stored in advance in the respective lattice points. Thereby, the RGB image data can be quickly converted to data corresponding to the use amounts of respective colors of ink by reading the gradation values stored in the lattice points.

For example, if it is assumed that the R component of the image data is RA, the G component thereof is GA and the B component thereof is BA, the image data are associated with the point A in the RGB color space (refer to FIG. 10). Therefore, a cube dV having the point A included therein is detected from minute cubes which is fragmented from the color solid, the gradation values of respective colors of ink, which are stored in the respective lattice points of the cube dV, are read. And, it is possible to obtain the gradation value of the point A by executing an interpolation calculation based on the gradation values the respective lattice points. As described above, it can be considered that the look-up table (LUT) is a three-dimensional numerical table in which combinations of gradation values corresponding to the use amounts of ink of respective colors of C, M, Y and K are stored in a plurality of lattice points established in the RGB color space. And, by referencing the look-up table, it is possible to quickly convert the RGB image data in terms of color. Also, herein, to simplify the description, the description was given under the assumption that the cube dV having the point A included therein is detected and an interpolation calculation is executed. However, in order to simplify the interpolation calculation, a tetrahedron having the point A included therein may be detected, and the gradation values at the point A may be obtained by executing an interpolation calculation based on the gradation values of respective colors of CMYK stored in the respective top of the tetrahedron.

After the color conversion processing is terminated as described above, a halftoning is executed in the image copy processing shown in FIG. 7 (Step S112). The gradation data corresponding to the use amounts of ink of respective colors of CMYK obtained by the color conversion processing are data which can take a value from the gradation value 0 through the gradation value 255 per pixel. To the contrary, in the printer section 200, the printer section takes only a status on whether or not a dot is formed, with attention directed to individual pixels since the printer section 200 prints an image by forming dots. Therefore, it is necessary to convert the CYMK gradation data having 256 gradations to data (dot data) showing whether or not a dot is formed per pixel. The halftoning is a processing for converting the CMYK gradation data to dot data.

As a method for executing the halftoning, various types of methods such as an error diffusion method and a dither method may be employed. The error diffusion method diffuses the error in gradation expression generated in a certain pixel, by judging whether or not dots are formed in regard to the pixel, to the peripheral pixels, and at the same time, judges whether or not dots are formed in regard to respective pixels, so that the error diffused from the periphery can be dissolved. Also, the dither method compares the threshold values set at random in a dither matrix with the CMYK gradation data per pixel, and, for pixels in which the CMYK gradation data are greater, judges that dots are formed, and for pixels in which the threshold value is greater, judges that no dot is formed, thereby obtaining dot data for the respective pixels.

Figure 11:
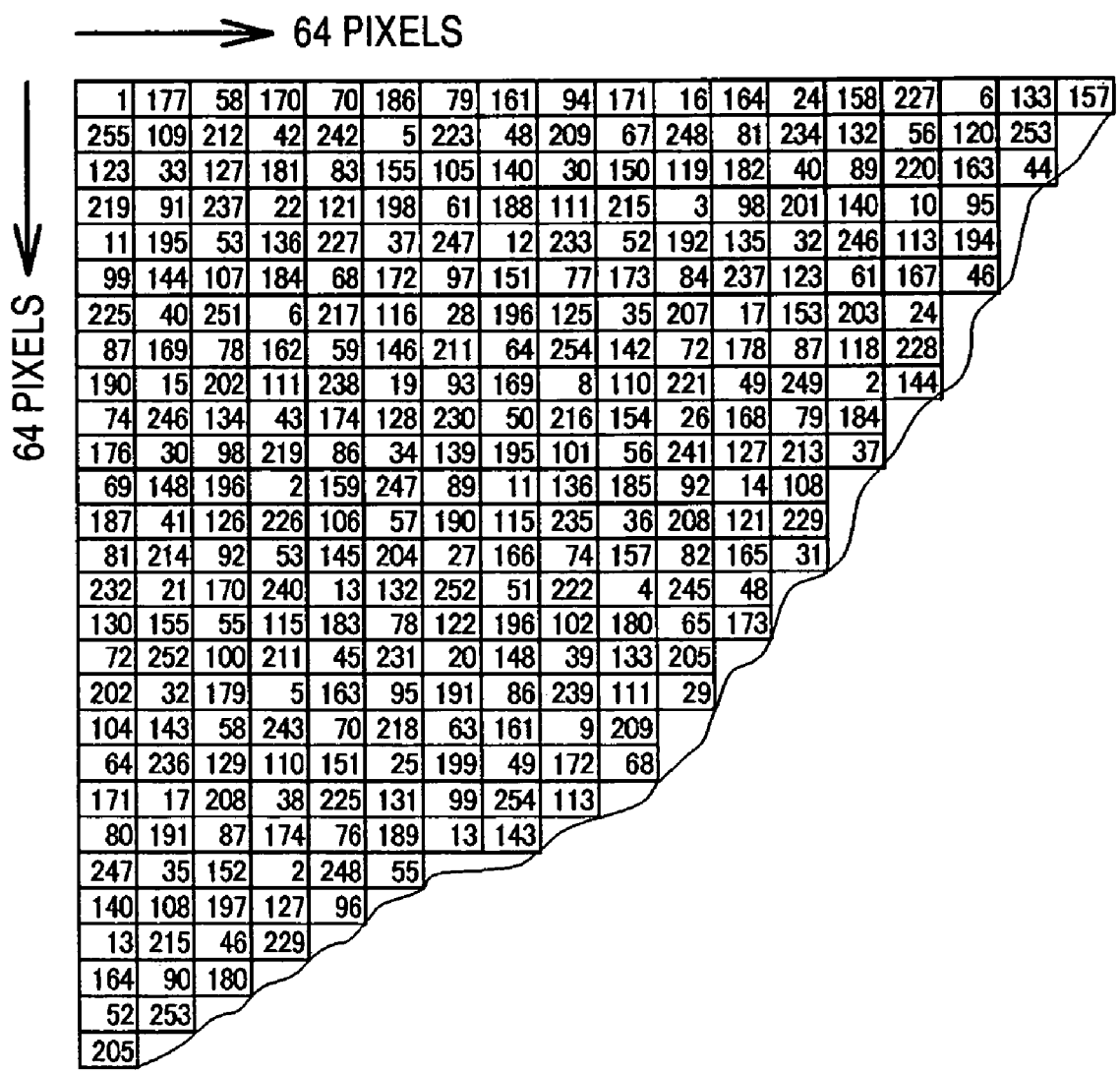
FIG. 11 is a diagram showing a part of a dither matrix used in a halftoning in the image copy processing.

FIG. 11 shows a part of the dither matrix. In the illustrated matrix, threshold values universally selected from the range of the gradation values 0 through 255 are stored at random in 4096 pixels consisting of 64 pixels disposed in both the vertical and horizontal directions. Herein, the reason why the gradation values of the threshold values are selected in the range of 0 through 255 corresponds to that the CMYK image data is of 1 byte in the embodiment, and the gradation value takes a value from 0 through 255. In addition, the size of the dither matrix is not limited to 64 pixels in both the vertical and horizontal directions as shown in FIG. 11, but may be set to various sizes including a case in which the number of pixels differs in the vertical and horizontal directions.

Figure 12:
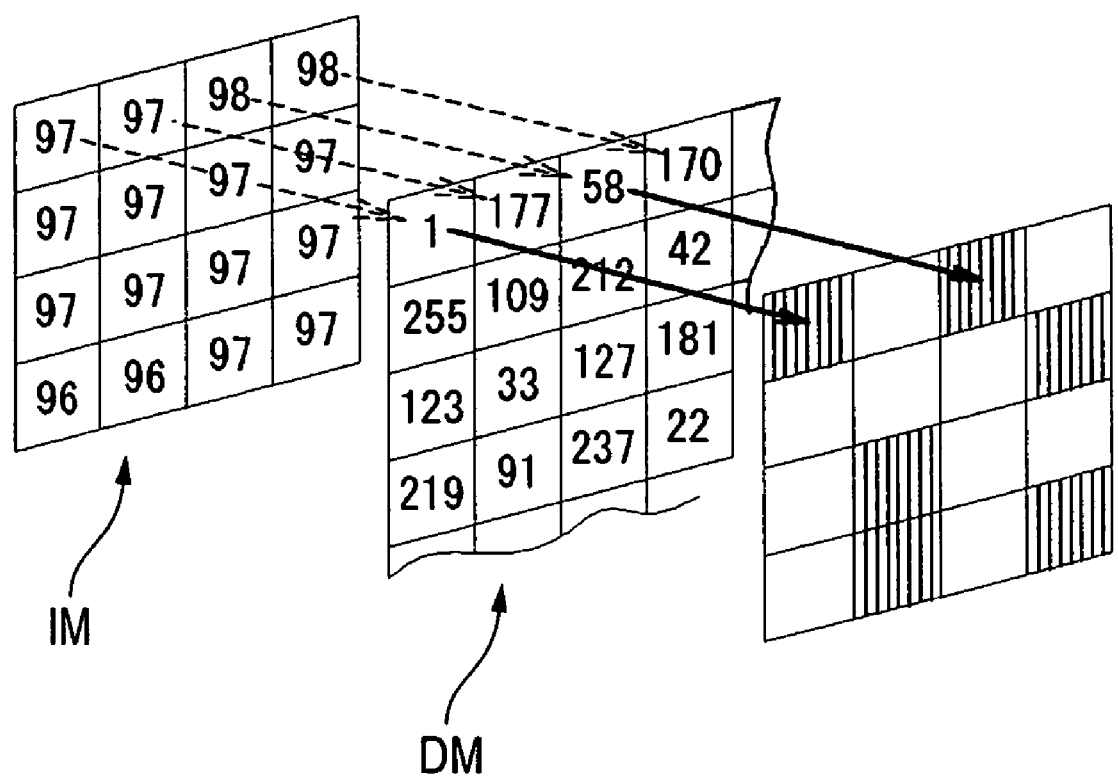
FIG. 12 is a diagram showing how to judge whether dots are formed for each pixel with reference to the dither matrix.

FIG. 12 shows how to judge whether or not dots are formed per pixel with reference to the dither matrix. Such judgment is made for respective colors of CMYK. However, hereinafter, to avoid complicated description, the CMYK image data are handled merely as image data without distinguishing respective colors of the CMYK image data.

When judging whether or not dots are formed, first, the gradation value of the image data IM for a pixel to which attention is focused as an object to be judged (pixel of interest) is compared with the threshold value stored in the corresponding position in the dither matrix DM. The arrow of a dashed line, which is shown in the drawing, schematically expresses that the image data of the noted pixel are compared with the threshold value stored in the corresponding position in the dither matrix. Where the image data of the noted image is greater than the threshold value of the dither matrix, it is judged that a dot is formed for the pixel. To the contrary, where the threshold value of the dither matrix is greater than the other, it is judged that no dot is formed for the pixel. In the example shown in FIG. 12, the image data of the pixel located at the left upper corner of the image is "97", and the threshold value stored in the position corresponding to the pixel in the dither matrix is "1". Therefore, since, on the pixel located at the left upper corner, the image data are greater than the threshold value of the dither matrix, it is judged that a dot is formed for the pixel. The arrow of a solid line shown in the FIG. 12 schematically expresses the state that the result of judgment is written in a memory upon judging that a dot is formed. On the other hand, in regard to a pixel adjacent to this pixel at the right side, the image data are "97", and the threshold value of the dither matrix is "177", wherein the threshold value is greater than the other. Therefore, it is judged that no dot is formed. Thus, by comparing the image data with the threshold value set in the dither matrix, it is possible to determine, at respective pixels, whether or not dots are formed. In the halftoning (Step S112 in FIG. 7), the above-described dither method is applied to the gradation data (CMYK image data) corresponding to the use amounts of respective ink of C, M, Y and K, whereby the processing of generating dot data is executed while judging, for each of the pixels, whether or not dots are formed.

After the gradation data of the respective colors of CMYK are converted to dot data, an interlacing is executed (Step S114). The interlacing re-arranges the dot data in the order along which the head unit 241 forms dots, and supplies the data to the printing heads 244 through 247 of the respective colors. That is, as shown in FIG. 6, since the nozzles Nz secured at the printing heads 244 through 247 are provided in the secondary scanning direction Y with the interval of nozzle pitch k spaced from each other, if ink drops are ejected while causing the printer carriage 240 to be subjected to primary scanning, dots are formed with the interval of nozzle pitch k spaced from each other in the secondary scanning direction Y. Therefore, in order to form dots in all the pixels, it is necessary that the relative position between the head 240 and a printing medium P is moved in the secondary scanning direction Y, and new dots are formed at pixels between the dots spaced only by the nozzle pitch k. As has been made clear from this, when actually printing an image, dots are not formed in the order from the pixels located upward on the image. Further, in regard to the pixels located in the same row in the primary scanning direction X, dots are not formed by one time of primary scanning, but dots are formed through a plurality of times of primary scanning based on the demand of the image quality, wherein it is widely executed that dots are formed at pixels in skipped positions in respective times of primary scanning.

Thus, in a case of actually printing an image, since it does not mean that dots are formed in the order of arrangement of pixels on the image, before actually commencing formation of dots, it becomes necessary that the dot data obtained for each of the colors of C, M, Y and K are re-arranged in the order along which the printing heads 244 through 247 form the same. Such a processing is called an "interlacing."

In the image copy processing, after the interlacing is completed, a processing of actually forming dots on a printing medium P (dot formation) is executed based on the data obtained by the interlacing (Step S116). That is, while causing the printer carriage 240 to be subjected to primary scanning by driving the carriage motor 230, the dot data (printing control data) whose order has been re-arranged are supplied to the printing heads 244 through 247. As described above, since the printing control data are data expressing whether or not dots are formed for each of the pixels, the printing heads 244 through 247 can form ink dots properly if the printing heads eject ink drops in compliance with the printing control data.

After one time of primary scanning is completed, the printing medium P is fed in the secondary scanning direction Y by driving the medium feeding motor 235. After that, again, the dot data (printing control data) whose order has been re-arranged are supplied to the printing heads 244 through 247 to form dots while causing the printer carriage 240 to be subjected to primary scanning by driving the carriage motor 230. By repeating such operations, dots of respective colors of C, M, Y and K are formed on the printing medium P at a proper distribution responsive to the gradation values of the image data, and an image corresponding to the original color image is copied.

As described above, as, in the color image copier 10, RGB image data are read from an original color image, a color image is printed based on the obtained RGB image data after correcting influences due to the chronological changes and individual unevenness. Therefore, it becomes possible to copy an original color image with accurate colors at all times. Further, when correcting influences due to the chronological changes and individual unevenness, the RGB image data are corrected in the Lab color space after the same data are once converted to data of the Lab color space. As a result, both the chronological changes and individual unevenness in the stage of generating RGB image data from an original color image and the chronological changes and individual unevenness in the stage of ejecting ink or adhering toner can be simply corrected with sufficient accuracy. That is, as described above, chronological changes and individual unevenness of the color image copier 10 occur in the stage of generating RGB image data by reading an original color image and in the stage of ejecting ink in compliance with the ink amounts determined based on the RGB image data. And, influences due to the chronological changes and individual unevenness in the stage of generating the RGB image data appear as changes in the RGB image data, and influences due to the chronological changes and individual unevenness in the stage of ejecting ink appear as changes in the amount of ejected ink, or, when being observed from its inverted side, appear in the mode as if the CMYK gradation values expressing the ink ejection amounts are changed.

Herein, as for the chronological changes and individual unevenness of the RGB image data, it is relatively easy to correct the same in the stage of RGB image data. However, after being converted to the CMYK image data, the correction becomes relatively difficult. On the other hand, as for the chronological changes and individual unevenness of the ink ejection amounts, it is relatively easy to correct the same after being converted to the CMYK image data. However, it is relatively difficult to correct the same in the stage of the RGB image data before being converted to the CMYK image data. In view of this, if there is an attempt to accurately correct the chronological changes and individual unevenness in either stage, it becomes necessary to correct data in both the stage of RGB image data and the stage of having converted to the CMYK image data. To the contrary, if the correction is executed in the Lab color space, it becomes possible to simultaneously and properly correct influences due to the chronological changes and individual unevenness in either stage.

The correction values used to correct image data in the Lab color space are set while being associated with the brightness. As a matter of course, it is considered that influences due to the chronological changes and individual unevenness of the color image copier 10 do not appear on the parts where the ground color of printing paper remains as it is (parts where the value of brightness is maximized), and that influences due to the chronological changes and individual unevenness are relatively small on a pure black portion (parts where the value of brightness is minimized). And, it is considered that parts where influences due to the chronological changes and individual unevenness appear relatively large are places where the brightness takes intermediate values. Since the correction values of the chronological changes and individual unevenness differ in compliance with the brightness like this, it becomes possible to carry out proper correction using the correction values associated with the brightness when correcting the image data in the Lab color space.

In addition, since the component "a" and component "b" can be independently corrected, it becomes possible to make further proper correction equivalent to an increase in the elements to be corrected.

Also, the above description was given under the assumption that the RGB image data are corrected after once the same data are converted to the Lab data in the Lab color space. However, the color space for conversion to correct the RGB image data is not necessarily limited to the Lab color space if it is a color space including coordinate axes corresponding to the brightness. Various types of color spaces such as, for example, XYZ color space (Y component corresponds to brightness) and HSB color space (B component corresponds to brightness) may be applicable.

Of course, there is an assumption that proper correction data by which chronological changes and individual unevenness can be properly corrected are stored, in order to copy an original color image with accurate colors by the above-described image copy processing. Therefore, a description is given below of a processing for generating correction data.

Figure 13:
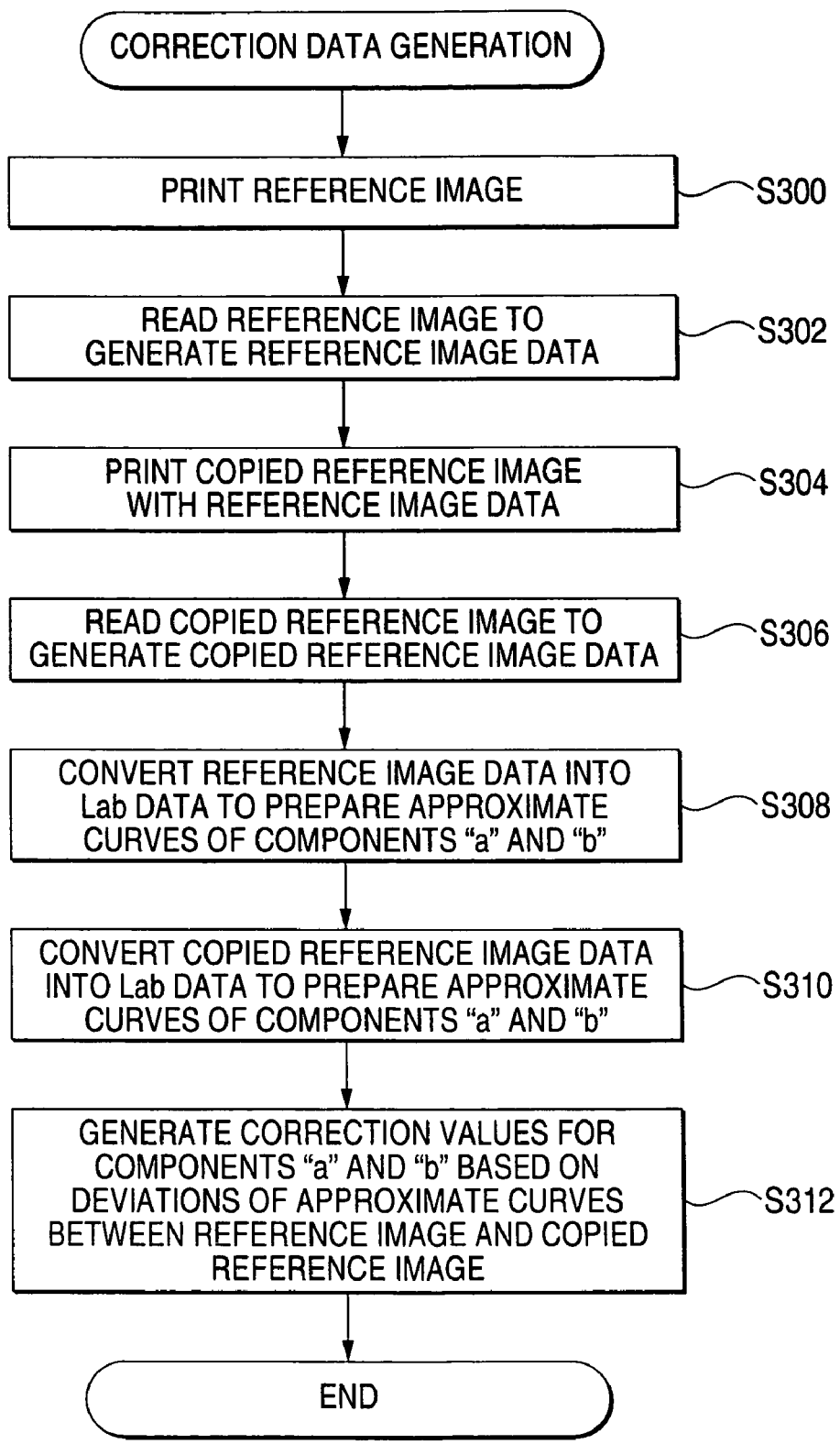
FIG. 13 is a flowchart showing a correction data generation executed in the color image copier.

FIG. 13 shows the processing for generating correction data to correct chronological changes and individual unevenness of the color image copier 10. Such a processing is executed by the control circuit 260 incorporated in the color image copier 10 as in the image copy processing shown in FIG. 7. Hereinafter, a description is given of the contents of the processing for generating correction data in compliance with the flowchart.

The control circuit 260 first prints a reference image as it commences the correction data generating processing (Step S300). Here, the reference image is an image exclusively used for correction of chronological changes and individual unevenness of the color image copier 10, and image data exclusive for printing the reference image are stored in advance in a ROM incorporated in the control circuit 260. In Step S300, the reference image is printed on a printing medium P based on the exclusive image data. Also, in the color image copier 10, an achromatic color gradation image, the brightness of which changes from white to black, is printed out as a reference image.

Next, RGB image data of the reference image are generated by reading the printed reference image (Step S320). Since the scanner function is incorporated in the color image copier 10 as described above, it is possible to immediately generate the RGB image data by setting the printed reference image on the original table 104 and scanning the image. In addition, the RGB image data thus obtained is called "reference image data" in the present specification.

Using the reference image data thus obtained, a copied image of the reference image (copied reference image) set on the original table 104 is printed out (Step S304). The copied reference image may be printed out by executing a processing almost identical to the image copy processing shown in FIG. 7. However, although, in the image copy processing in FIG. 7, the processings for correcting chronological changes and individual unevenness of the color image copier 10 (refer to the processings from Step S104 through Step S108) are executed, here, these processings are not executed because the correction data used for such processings are attempted to be generated. Hereinafter, a brief description is given of the contents of the processing for printing the copied reference image (Step S304 in FIG. 13), utilizing the image copy processing shown in FIG. 7.

First, the printing resolution is converted for the reference image data (equivalent to Step S102 in FIG. 7). Next, by executing the color conversion processing, the reference image data are converted to the image data equivalent to the ink amounts of respective colors of CMYK (equivalent to Step S110). The thus obtained image data of respective colors of CMYK are subjected to a halftoning and it is determined for respective pixels whether or not dots are formed (equivalent to Step S112). After an interlacing is given to the obtained dot data (equivalent to Step S114), dots are formed by actually ejecting ink drops of respective colors (equivalent to Step S116). Thereby, a copied reference image equivalent to a copied image of the reference image set on the original table 104 is formed on a printing medium P. In Step S304 in FIG. 13, a copied reference image is thus printed out.

By reading an image with the copied reference image set on the original table 104 after the copied reference image is thus obtained, the RGB image data of the copied reference image are generated (Step S306). In the present specification, the RGB image data generated by thus reading the copied reference image are called "copied reference image data".

Figure 14:
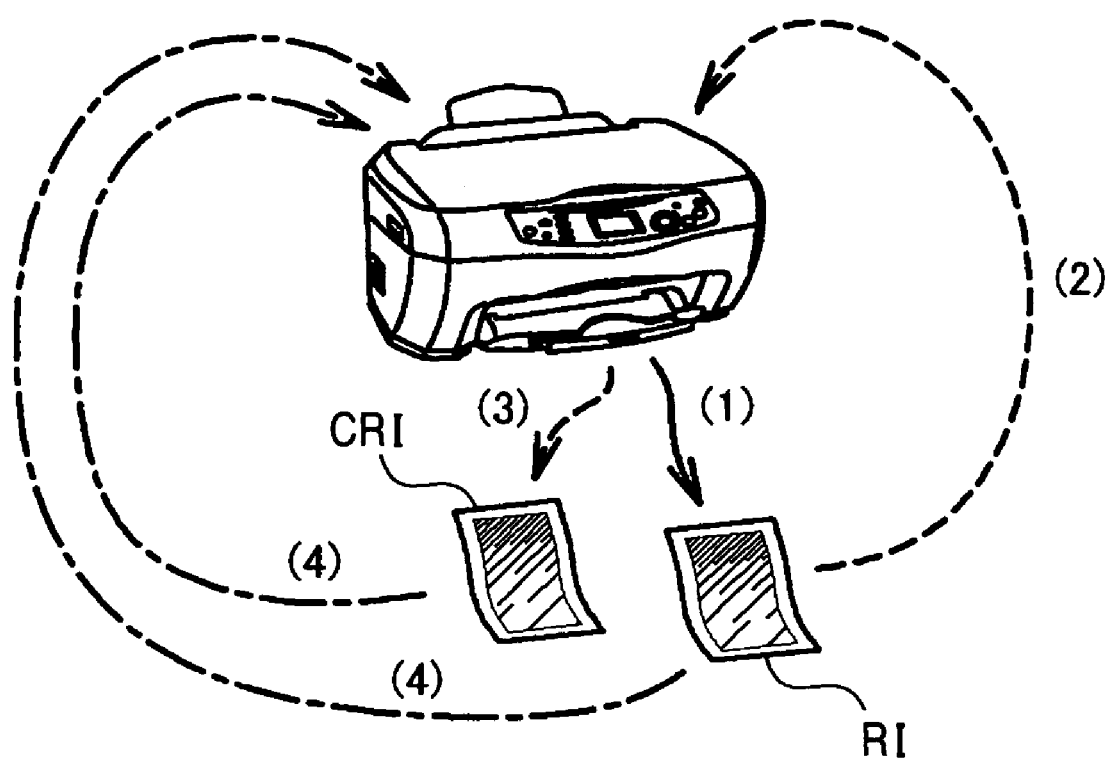
FIG. 14 is a diagram showing how to obtain reference image data and copied reference image data in the correction data generation.

FIG. 14 shows how to generate the reference image data and the copied reference image data. As described above, when generating these image data, first the reference image is printed using the color image copier 10. Using the arrow (1) of a solid line, FIG. 14 shows a state that the color image copier 10 prints the reference image RI. Next, the reference image data are generated by reading the printed reference image, and a copied reference image CRI is printed based on the reference image data. Using the arrows of dashed lines (2) and (3), FIG. 14 shows a state that the reference image data are generated by reading the reference image, and a copied reference image is printed based on the reference image data. It is possible to generate the copied reference image data by reading the thus obtained copied reference image. At this time, as the reference image data, the reference image data used to print the copied reference image may be used as it is, or the copied reference image data and the reference image data may be simultaneously obtained by simultaneously reading the reference image when reading the copied reference image. Using the arrows of chain lines (4), FIG. 14 shows a state that the copied reference image data (and the reference image data) are generated by reading the copied reference image (and the reference image).

If the reference image data and the copied reference image data are simultaneously generated by simultaneously reading the reference image and the copied reference image as shown in FIG. 14, it is possible to read the reference image and the copied reference image completely under the same conditions. For this reason, noise mixture is suppressed, and it becomes possible to generate accurate correction data. On the other hand, if, as the reference image data, data used for printing the copied reference image are used as they are, and the copied reference image data are generated by reading only the copied reference image, the size of the reference image can be made relatively large. Based on the reason described later, if the size of the reference image is too small, accurate correction data cannot be obtained. In view of this meaning, if a sufficient size of a reference image can be used, it becomes possible to generate further accurate correction data.

Thus, after the reference image data and the copied reference image data are obtained, the reference image data are converted to data (Lab data) in the Lab color space, wherein a processing for generating approximate curves of the component "a" and component "b" for the brightness L is executed (Step S308 in FIG. 13). This processing is as follows. First, if a well-known conversion equation is applied to the image data since the reference image data are data in which RGB image data are set per pixel, it is possible to convert the image data to the Lab data per pixel. At this time, the image data may be converted by referencing the profile showing the characteristics of the scanner section. Next, the Lab data per pixel are summarized in the form of a scatter diagram of the component "a" for the component "L" and a scatter diagram of the component "b" for the component "L," wherein the mean value of the component "a" and the mean value of the component "b" per gradation value of the component "L" are calculated. As a result, it is possible to obtain the mean values of the component "a" and the mean value of the component "b" for the respective gradation values of the brightness L.

Figure 15:
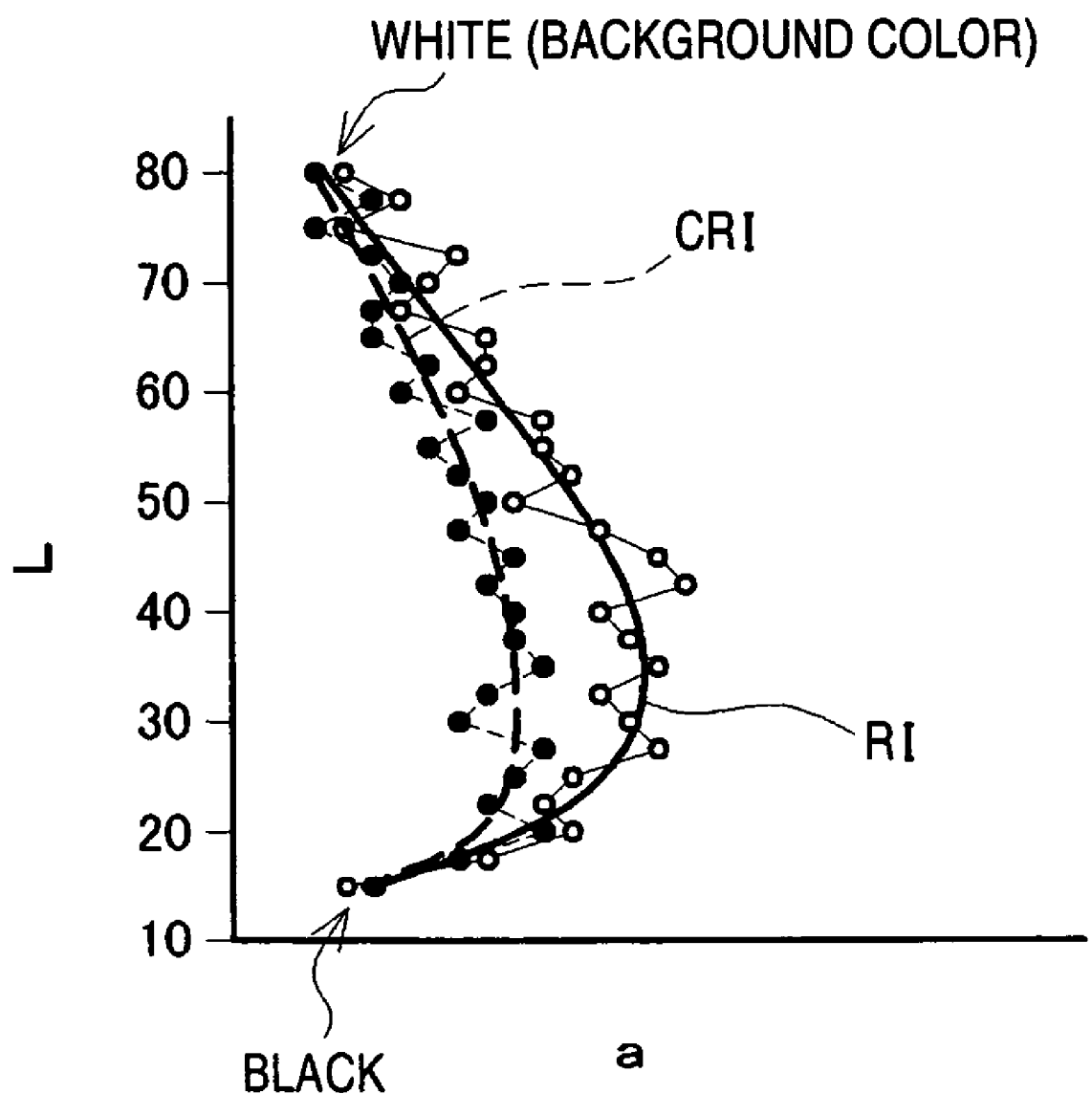
FIG. 15 is a diagram showing approximate curves expressing relationships between mean values of the component "a" and brightnesses "L" for a reference image and a copied reference image, which are obtained by the correction data generation.

FIG. 15 shows a state that the mean value of the component "a" for the brightness L is thus obtained. In the drawing, the mean value of the component "a" for the brightness L is expressed by a white circle. As illustrated, a rough tendency of the mean values of the component "a" is such that these mean values take a small value in the portions where the brightness L takes a small value (that is, portions corresponding to a black image) and the portions where the brightness L takes a large value (white image, that is, portions close to the background color of paper), and the mean values take a relatively large value in the portions where the brightness L takes an intermediate value. However, these mean values are relatively greatly uneven. Since the unevenness can be reduced in line with an increase in the number of samples used for calculation of the mean values, that is, an increase in the number of pixels, it is preferable that the size of the reference image is large to a certain degree so that a certain number of pixels can be secured.

After the mean value of the component "a" for the gradation value of the brightness L is obtained, the mean value is approximated by an approximate curve in which the brightness L is used as a variable. As a method for determining the approximate curve, it is possible to employ a well-known method such as the least-squares method. The curve shown by a solid line expresses an approximate curve of the component "a" thus determined. As for the component "b," the mean values of the component "b" of the brightness L are obtained, and these mean values may be approximated by an approximate curve in which the brightness L is used as a variable. In Step S308 in FIG. 13, the processing for determining approximate curves of the component "a" and the component "b" for the brightness L is executed.

Subsequently, with respect to the copied reference image data, approximate curves of the component "a" and the component "b" for the brightness L are determined (Step S310) as in the above. That is, the RGB image data set in respective pixels of the copied reference image data are converted to Lab data, wherein a scatter diagram of the component "a" for the component "L" and a scatter diagram of the component "b" for the component "L" are prepared. Next, after the mean values of the component "a" and the mean values of the component "b" for the respective components "L" are obtained, respective approximate curves are determined. Black circles shown in FIG. 15 express the mean values of the component "a," which are acquired from the copied reference image data. In addition, a curve shown with a dashed line in FIG. 15 expresses an approximate curve of the component "a" thus determined. With respect to the component "b," it is possible to determine an approximate curve for the brightness L as in the above.

As described above, after the approximate curve of the component "a" and the approximate curve of the component "b," which are obtained for the reference image, and the approximate curve of the component "a" and the approximate curve of the component "b," which are obtained for the copied reference image, are determined, the correction values are determined by comparing these approximate curves per component (Step S312). A description is given of such a processing with reference to FIG. 15.

FIG. 15 shows an approximate curve of the component "a" obtained for the reference image and an approximate curve of the component "a" obtained for the copied reference image. As described above, the copied reference image is an image printed based on the RGB image data obtained by reading the reference image by the scanner. Accordingly, if the RGB image data are generated by completely accurately reading the colors of the reference image and further the colors expressed by the RGB image data can be printed with completely accurate colors, the approximate curve obtained for the copied reference image must overlap the approximate curve of the reference image. In other words, deviations between the two approximate curves are those reflected by the chronological changes and individual unevenness, which occur in the scanner section 100 of the color image copier 10, and reflected by the chronological changes and individual unevenness, which occur in the printer section 200. Therefore, if the differences between these two approximate curves are obtained, and the approximate curve (the curve shown by a dashed line in FIG. 15) for the copied reference image is corrected to the approximate curve (the curve shown by a solid line in FIG. 15) for the reference image, it becomes possible to simultaneously and accurately correct the chronological changes and individual unevenness of the scanner section 100 and the chronological changes and individual unevenness of the printer section 200.

Figure 16A:
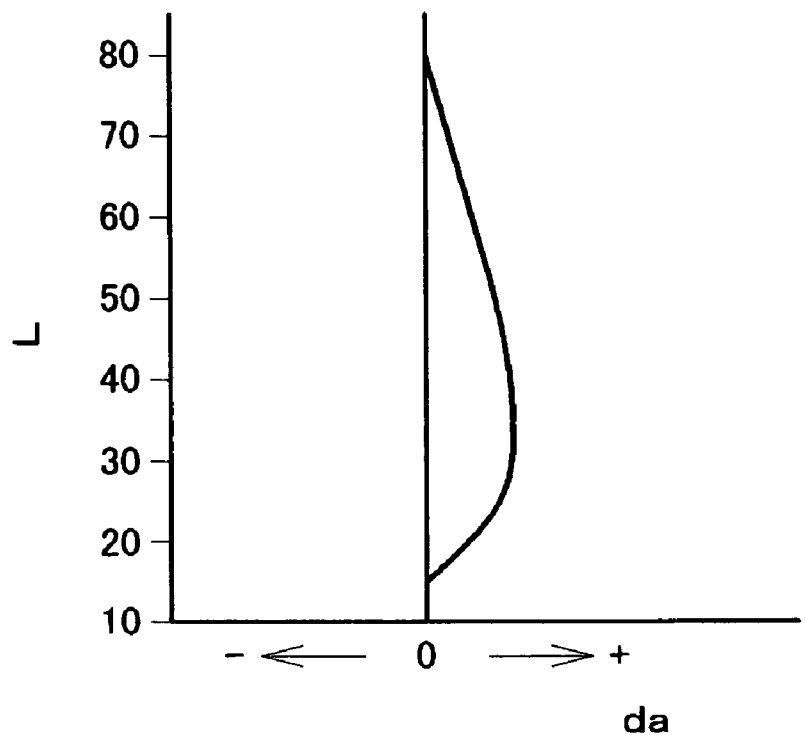
FIGS. 16A and 16B are diagrams showing relationships between brightnesses "L" and correction values "da" and "db" for the components "a" and "b" obtained by the correction data generation.
Figure 16B:
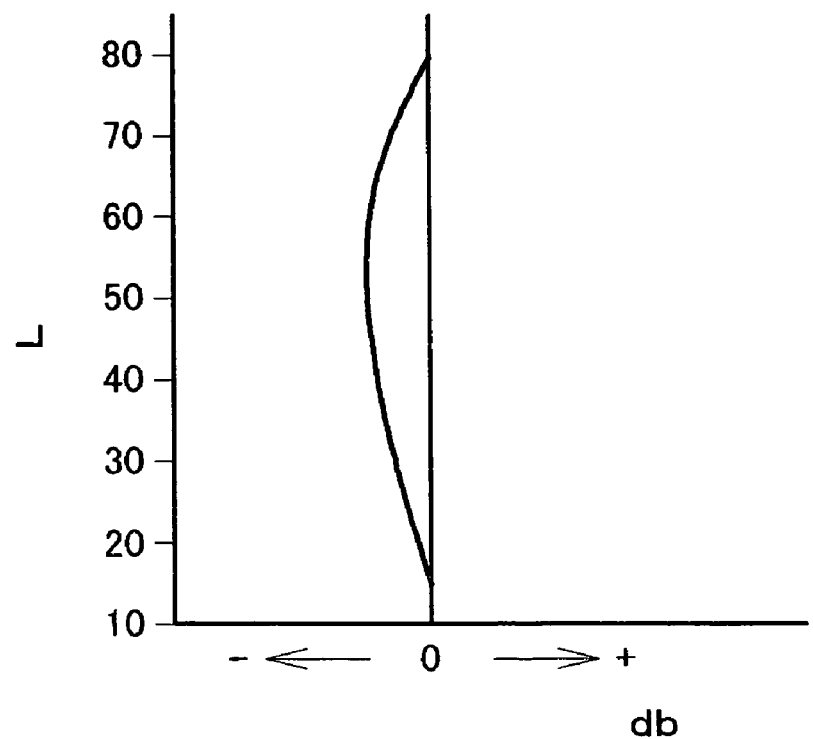

FIGS. 16A and 16B show the correction values "da" and "db" obtained from the deviations between the approximate curve of the reference image and that of the copied reference image. Further, where the correction value takes a positive value, it is meant that the component "a" or component "b" of the copied reference image are made smaller than the component "a" or component "b" of the reference image due to the chronological changes and individual unevenness. To the contrary, where the correction value takes a negative value, it is meant that the component "a" or component "b" of the copied reference image are made larger than the component "a" or component "b" of the reference image. Therefore, where the Lab data are corrected by using the correction values thus obtained, it is sufficient that the correction values of the corresponding components are added to the component "a" and component "b" of the Lab data.

In Step S312 in FIG. 13, as described above, such a processing is executed, in which a correction value "da" for the component "a" and a correction value "db" for the component "b" are obtained per brightness L, and the obtained correction values are stored in a RAM incorporated in the control circuit 260.

As a method for storing the correction values of the respective components, the correction value "da" for the component "a" and the correction value "db" for the component "b" may be stored per gradation value of the brightness L, or the correction value "da" and the correction value "db" may be stored in the form of approximate equations in which the brightness L is used as a variable. As examples illustrated in FIG. 16, the correction values become a smaller value (almost zero) in either the upper limit value or the lower limit value that the brightness L can take, and has a tendency to gradually become large toward intermediate brightness L. In the color image copier 10, with attention focused on this point, the correction values are stored in the following mode.

Figure 17:
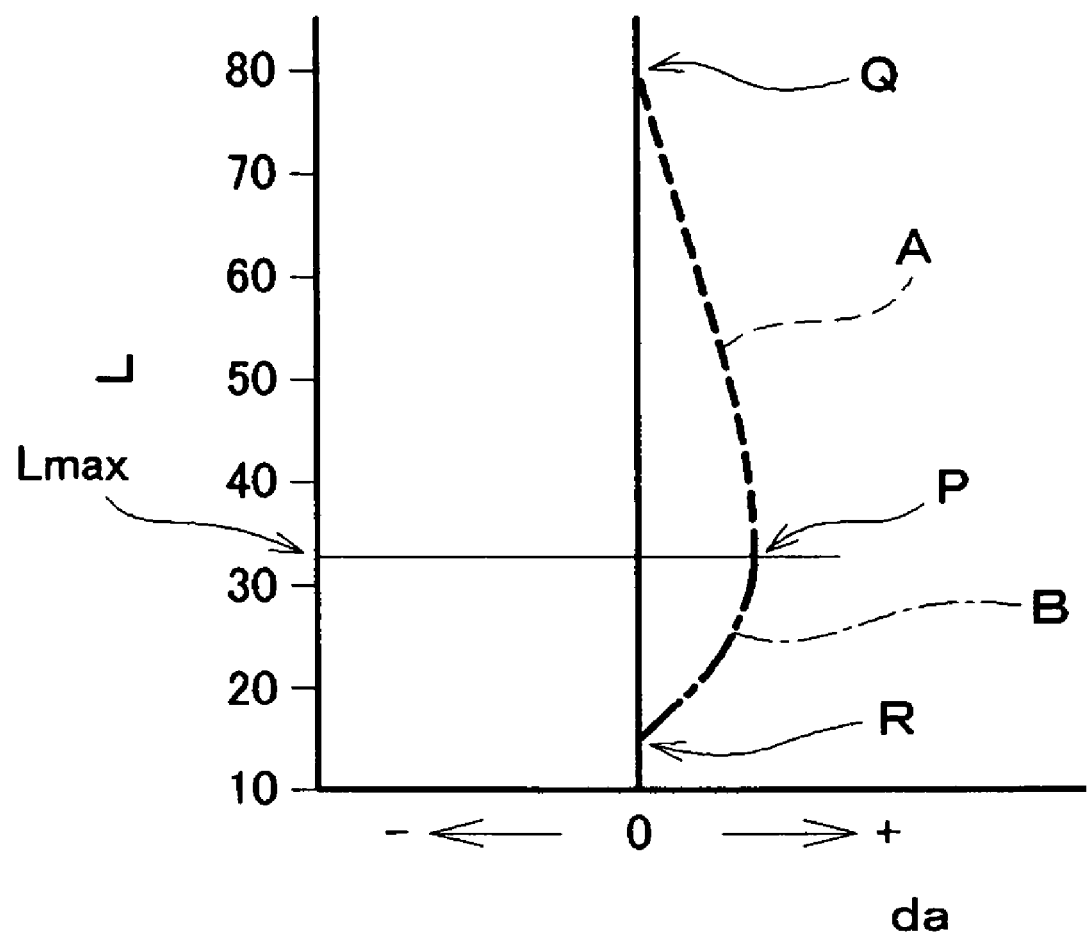
FIG. 17 is a diagram showing how to store the correction values in a memory in the color image copier.

FIG. 17 shows how to store the correction value "da" and the correction value "db" in the color image copier 10. When storing the correction values, first, the value Lmax of brightness at which the absolute value of the correction values is maximized is obtained. Next, the brightness is divided into an area of higher brightness L than the brightness Lmax and an area of lower brightness L than the brightness Lmax, and the correction values are approximated by a quadratic curve in which the brightness L is used as a variable in the respective areas. When approximating the correction values, the quadratic curve (expressed as a quadratic curve A in the drawing) of the higher-brightness side area and the quadratic curve (expressed as a quadratic curve B therein) of the lower-brightness side area are established so that the straight line showing the brightness Lmax becomes the center axis. In addition, since it is considered that influences due to chronological changes and individual unevenness hardly appear at the upper limit value of the brightness L (that is, the portion equivalent to the ground color of paper) and at the lower limit value of the brightness L (that is, the portion equivalent to a pure black image), it is assumed that the correction values at the upper limit value and lower limit value of the brightness L are zero. Therefore, at a higher-brightness side area, a quadratic curve A passing through points P and Q, for which the brightness Lmax is set as the center axis, can be determined. At a lower-brightness side area, a quadratic curve B passing through points P and R, for which the brightness Lmax is set as the center axis, can be determined.

In the control circuit 260 according to the embodiment, the correction value "da" for the component "a" and the correction value "db" for the component "b" are stored in the mode of such quadratic approximate curves. In such a configuration, since the correction values are selected with such a tendency taken into consideration by which the correction values become almost zero at the upper limit value and the lower limit value of the brightness L and gradually becomes larger toward intermediate brightness L, the memory capacity necessary to store the correction values can be made smaller while securing sufficient accuracy.

Next, a description is given of the reason why an achromatic color gradation image is used as the reference image in the correction data generation processing according to the embodiment. If an achromatic color gradation image is used as the reference image, it becomes possible to efficiently generate accurate correction data. This is enabled by the following reason.

First, in a case of reading an achromatic color gradation image, since the respective components of RGB are almost uniformly outputted from the CCD sensor 118 incorporated in the scanner section 100, it is possible to look into the influences due to chronological changes and individual unevenness in regard to the respective components with sufficient accuracy at one time. When printing an achromatic color gradation image, an area having high brightness (bright area) is printed while almost uniformly using ink of respective colors of CMY, and an area having low brightness (dark area) is printed using K ink. Therefore, since an achromatic color gradation image is printed by using ink of all of CMYK, it is possible to look into the influences due to chronological changes and individual unevenness, when ejecting respective colors of ink, with sufficient accuracy at one time. After all, since an achromatic color gradation image is used as a reference image, chronological changes and individual unevenness at the scanner section 100 and chronological changes and individual unevenness at the printer section 200 can be simultaneously evaluated with accuracy, wherein it becomes possible to efficiently generate accurate correction data.

Additionally, the visual sense of a human being generally is likely to sensitively recognize particularly a difference in color on an achromatic image (in particular, a gray image). From this standpoint, if an achromatic image, to which a human being is most sensitive, is used as a reference image in order to generate correction data, this is favorable since proper correction data can be efficiently generated.

In the embodiment described above, whenever copying an image by reading an original color image, the image data are corrected in the Lab color space, the after-correction image data are converted to the RGB image data, and the image is printed. However, since it becomes necessary for the RGB image data to be color-converted to image data of the respective colors of CMYK when printing a color image, influences due to chronological changes and individual unevenness may be corrected at the same time when color conversion is executed. Hereinafter, a description is given of such a configuration as a second embodiment of the invention.

Figure 18:
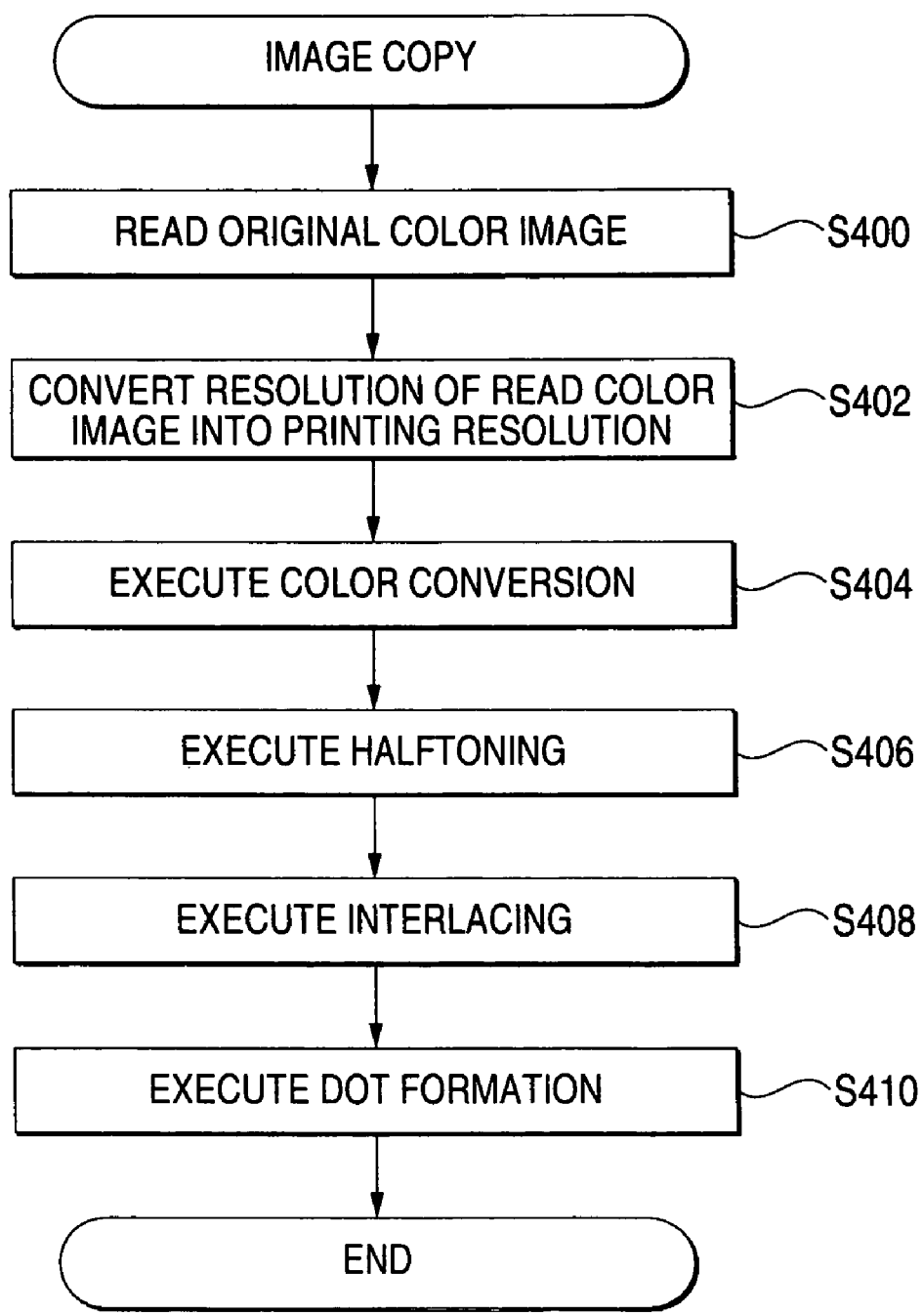
FIG. 18 is a flowchart showing an image copy processing executed in a color image copier according to a second embodiment of the invention.

FIG. 18 shows an image copy processing according to the second embodiment of the invention. Such a processing greatly differs from the above embodiment in that, when executing the image copy processing described above using FIG. 7, influences due to chronological changes and individual unevenness are corrected in the meantime of executing the color conversion processing without converting the RGB image data generated by reading the original color image to the Lab data.

Also in this embodiment, the processing is executed, wherein an original color image set on the original table 104 is read, and the RGB image data are generated (Step S400). After that, the resolution of the RGB image data obtained is converted to the resolution (printing resolution) for the printer section 200 to print (Step S402).

After the resolution of the image data is thus converted to the printing resolution, the color conversion processing is immediately executed in the image copy processing according to the modified version 1 (Step S405). In the color conversion processing, the RGB image data are converted to the image data corresponding to the ink amounts of respective colors of CMYK by referencing the look-up table as in the image copy processing described above using FIG. 7. However, the look-up table to be referred to in the modified version 1 greatly differs from the color conversion processing according to the above-described embodiment in that the look-up table is established with the chronological changes and individual unevenness of the color image copier 10 taken into consideration so that a color image of correct colors can be printed. A method for preparing such a look-up table will be described later.

As the color conversion processing is completed, the subsequent processings are almost identical to those in the image copy processing described above using FIG. 7. That is, a halftoning is given to the image data of the respective colors of CMYK obtained by the color conversion processing, wherein the image data are converted to dot data expressing whether or not dots are formed per pixel (Step S406). Next, an interlacing is given to the dot data thus obtained, which rearranges the dot data in the order for the printer head unit 241 to form dots (Step S408). Based on the data thus obtained, it is possible to obtain a color copied image by actually forming dots on a printing medium P (Step S410).

As described above, with the image copy processing according to this embodiment, it is possible to correct the influences due to chronological changes and individual unevenness of the color image copier 10 at the same time when the RGB image data obtained by reading an original color image are converted to CMYK image data. Therefore, the original color image can be quickly copied with accurate colors. As a matter of course, to enable the above, there is an assumption that a look-up table is prepared which enables accurate correction of the influences due to chronological changes and individual unevenness of the color image copier 10. Accordingly, a description is given below of a processing for preparing such a look-up table.

Figure 19:
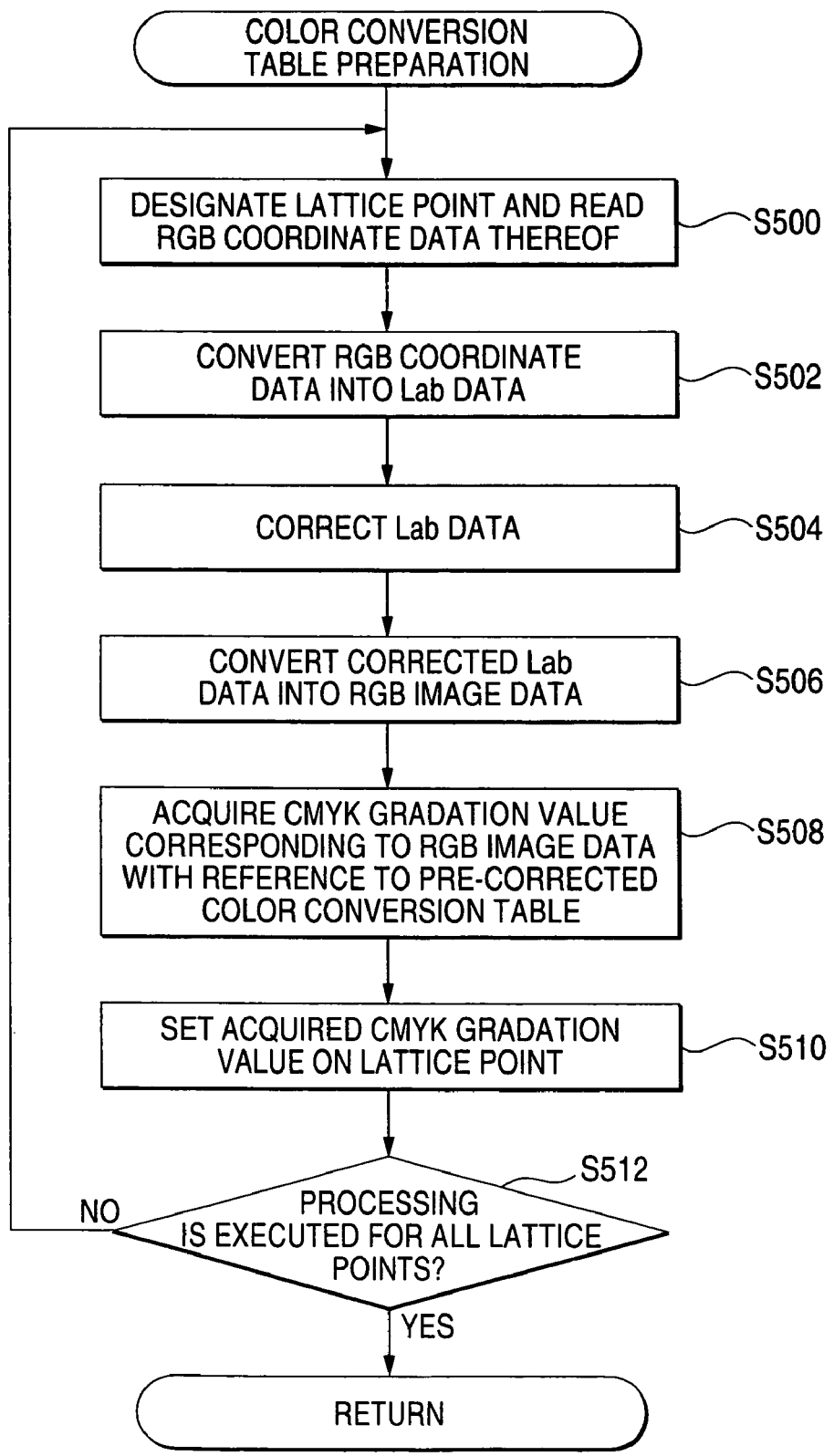
FIG. 19 is a flowchart showing a processing for preparing a color conversion table used in the image copy processing of FIG. 18.

FIG. 19 shows a processing for preparing a look-up table with influences due to chronological changes and individual unevenness of the color image copier 10 taken into consideration. In order to carry out such a processing, there is an assumption that correction data to correct influences due to chronological changes and individual unevenness, which are shown in FIG. 16, are obtained in advance. Therefore, the processing for setting a look-up table, shown in FIG. 19, is executed by giving instructions to the control circuit 260 on the control panel 300 of the color image copier 10 after generating correction data by executing the correction data generating processing shown in FIG. 13.

As the processing for setting a look-up table is executed, first, one of the arbitrary lattice points is selected from a plurality of lattice points established in the look-up table, and the coordinate values (that is, RGB image data) of the lattice point are acquired (Step S500).

Next, the RGB image data thus obtained are converted to data (Lab data) in the Lab color space (Step S502). Such conversion can be executed by using a predetermined conversion equation as in Step S104 of the image copy processing shown in FIG. 7. At this time, if the conversion is executed by referencing the profile showing the characteristics of the printer section 200, it is possible to print with accurate colors. And, the Lab data are corrected based on the correction data obtained in advance (Step S504). Since the processing of correcting the Lab data based on the correction data is similar to the processing described above using FIG. 8, a description thereof is omitted here.

Thus, the Lab data corrected in the Lab color space are converted to RGB image data (Step S506). Conversion from the Lab data to the RGB image data can be executed by applying inverted conversion of the conversion in Step S502. At this time, the conversion may be executed by referencing the profile showing the characteristics of the scanner section. If so, it is possible to convert to further accurate colors.

Continuously, the RGB image data obtained by inverted conversion are converted to the CMYK image data (Step S508). Such conversion may be executed by referencing the current look-up table. The obtained gradation values of the respective colors of the CMYK are set to the selected lattice points (Step S510). That is, the RGB image data corresponding to the coordinate values of the selected lattice points are converted to different RGB image data by being corrected in the Lab color space, wherein the gradation values of CMYK, which are set while being associated with the RGB image data, are set to the selected lattice points.

After the CMYK gradation values are set to the thus selected lattice points, it is judged whether or not the CMYK gradation values are set for all the lattice points set in the look-up table (Step S512). And, where there still remains any lattice point for which the gradation value is not set (Step S512: no), after the processing is returned to Step S500 and one of new lattice points is selected, a series of the above-described processings is executed. By repeating such operations, when it is judged that the CMYK gradation values are set for all the lattice points (Step S512: yes), the processing of setting a look-up table shown in FIG. 19 is terminated.

The CMYK gradation values corrected based on the correction data are set in respective lattice points of the look-up table thus obtained. And, the correction data are made into data established to correct influences due to chronological changes and individual unevenness of the color image copier 10. For this reason, in the image copy processing according to this embodiment the influences due to chronological changes and individual unevenness of the color image copier 10 can be properly corrected only by executing color conversion by referencing such a look-up table, wherein it becomes possible to copy a color image with correct colors.

In the embodiments described above, the RGB image data are once converted to data in the Lab color space, and image data are corrected for each of the component "a" and the component "b." This is because, in the Lab color space, either the hue or color saturation is expressed by a combination of the component "a" and the component "b" while the brightness is expressed by the component "L." However, various color spaces have been well-known as the color space. Of these, a color space that is able to express hue and color saturation by a single component, respectively, is available. For example, in the HSB color space, the H component expresses hue, and S component expresses color saturation. Where correction is executed in such a color space, correction may be executed only for the H component expressing the hue, or correction may be executed only for the S component expressing the color saturation.

Since there is a tendency that the influences due to chronological changes and individual unevenness of the color image copier 10 appear more in the hue than in the color saturation, it is possible to copy an original color image with correct colors only by executing correction for one component.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2005-289682 filed Oct. 3, 2005 including specification, drawings and claims is incorporated herein by reference in its entirety.

What is claimed is:

1. A method of copying an original color image, comprising:

reading the original color image to generate color image data;

converting the color image data into coordinate data including values associated with a first coordinate value and a second coordinate value in a color space, the first coordinate value being indicative of brightness;

acquiring correction data including values corresponding to the second coordinate value which are determined in accordance with the values included in the coordinate data and associated with the first coordinate value;

correcting the coordinate data with the correction data;

printing a color image with the corrected coordinate data, thereby obtaining a copied image of the original color image;

printing a reference image with color image data stored in advance;

reading the reference image to generate reference image data;

printing a copied image of the reference image with the reference image data;

reading the copied image of the reference image to generate copied reference image data;

converting the reference image data into first coordinate data including first values associated with the first coordinate value and the second coordinate value;

converting the copied reference image data into second coordinate data including second values associated with the first coordinate value and the second coordinate value;

comparing the reference image data and the copied reference image data to identify deviations between the first values associated with the second coordinate value and the second values associated with the second coordinate value under a condition that the first values associated with the first coordinate value and the second values associated with the second coordinate value have the same values; and determining the correction data based on the deviations,
wherein the reference image is an achromatic image.

2. The method as set forth in claim 1, wherein:
the correction data is configured such that no correction is applied to the second coordinate value in a case where the first coordinate value assumes a minimum value thereof or a maximum value thereof.

3. The method as set forth in claim 1, wherein:
the correction data is provided in the form of a multi-dimensional function in which the brightness is a variable.

4. A color image copier, comprising:
a reader, adapted to read an original color image to generate color image data;
a converter, operable to convert the color image data into coordinate data including values associated with a first coordinate value and a second coordinate value in a color space, the first coordinate value being indicative of brightness;
an acquirer, operable to acquire correction data including values corresponding to the second coordinate value which are determined in accordance with the values included in the coordinate data and associated with the first coordinate value;
a corrector, operable to correct the coordinate data with the correction data;
a printer, operable to print a color image with the corrected coordinate data, thereby obtaining a copied image of the original color image, wherein:
the printer is operable to print a reference image with color image data stored in advance;
the reader is adapted to read the reference image to generate reference image data;
the printer is operable to print a copied image of the reference image with the reference image data;
the reader is adapted to read the copied image of the reference image to generate copied reference image data;
the converter is operable to convert the reference image data into first coordinate data including first values associated with the first coordinate value and the second coordinate value;
the converter is operable to convert the copied reference image data into second coordinate data including second values associated with the first coordinate value and the second coordinate value,
wherein the color image copier further comprises:
a comparator, operable to compare the reference image data and the copied reference image data to identify deviations between the first values associated with the second coordinate value and the second values associated with the second coordinate value under a condition that the first values associated with the first coordinate value and the second values associated with the second coordinate value have the same values; and
a correction data provider, operable to determine the correction data based on the deviations; and
wherein the reference image is an achromatic image.

5. A recording medium having recorded thereon a program operable to cause a computer to execute the method as set forth in claim 1.

* * * * *